United States Patent
Jackson et al.

(10) Patent No.: US 11,890,766 B1
(45) Date of Patent: Feb. 6, 2024

(54) DUCTWORK INSULATION WRAP MODULAR FABRICATION TOOL

(71) Applicant: NTH SOLUTIONS, Coatesville, PA (US)

(72) Inventors: Nicholas R. Jackson, Coatesville, PA (US); Stephen T. Buchanan, Landenberg, PA (US); Eric L Canfield, Downingtown, PA (US)

(73) Assignee: NTH SOLUTIONS, LLC, Coatesville, PA (US)

( * ) Notice: Subject to any disclaimer, the term of this patent is extended or adjusted under 35 U.S.C. 154(b) by 0 days.

(21) Appl. No.: 18/081,037

(22) Filed: Dec. 14, 2022

(51) Int. Cl.
  *B26D 7/00* (2006.01)
  *F16L 59/02* (2006.01)
  *F24F 13/02* (2006.01)

(52) U.S. Cl.
  CPC ............ *B26D 7/0006* (2013.01); *F16L 59/02* (2013.01); *F24F 13/0263* (2013.01)

(58) Field of Classification Search
  CPC ..... B26D 7/0006; F16L 59/02; F24F 13/0263
  USPC .................................................. 138/141, 166
  See application file for complete search history.

(56) References Cited

U.S. PATENT DOCUMENTS

| | | | | |
|---|---|---|---|---|
| 2,670,763 A * | 3/1954 | Hiss | ........................ | F16L 9/003 411/530 |
| 3,242,948 A * | 3/1966 | Dunn | ..................... | F16L 59/022 138/166 |
| 3,347,276 A * | 10/1967 | Dunn | ..................... | F16L 59/022 138/166 |
| 4,371,578 A * | 2/1983 | Thompson | .............. | F16L 47/22 138/167 |
| 4,442,153 A * | 4/1984 | Meltsch | ............. | H02G 15/1813 428/128 |
| 4,442,155 A * | 4/1984 | Foertsch | ................. | F16L 59/10 24/19 |
| 4,532,168 A * | 7/1985 | Steele | ................. | B29C 61/0633 428/129 |
| 5,435,667 A * | 7/1995 | Strange | ..................... | E02D 5/64 428/57 |
| 2018/0112887 A1* | 4/2018 | Fanelli | ...................... | F24F 11/30 |
| 2019/0017723 A1* | 1/2019 | Surraco | ..................... | B32B 3/10 |

* cited by examiner

*Primary Examiner* — Craig M Schneider
*Assistant Examiner* — David R Deal
(74) *Attorney, Agent, or Firm* — Panitch Schwarze Belisario & Nadel LLP

(57) ABSTRACT

A modular fabrication tool for prefabricating insulation for a duct segment includes at least three interchangeable and detachably connected panels, each panel of the at least three panels corresponding to a respective side of the duct segment. Each panel includes at least one of a connecting bar extending beyond a periphery of the respective panel or a connecting track. A connecting bar of one panel is received by a connecting track of a neighboring panel when two neighboring panels are properly positioned, adjoined together, whereby a retaining pin of the tool is advanceable through aligned, respective apertures of the connecting track and the connecting bar received therein.

15 Claims, 22 Drawing Sheets

DUCTWORK INSULATION WRAP MODULAR FABRICATION TOOL

BACKGROUND OF THE DISCLOSURE

The disclosure generally relates to a modular tool for prefabricating ductwork insulation wrapping.

In a typical construction job, wherein ductwork is wrapped with insulation, a considerable amount of time is spent on wrapping the ductwork with insulation. Each duct, for example, may take in excess of 20 minutes to cut an appropriate portion of insulation and wrap it around. This is a costly process, both in excess waste during imprecise cutting, as well as the cost of labor.

Currently, HVAC insulation is purchased in large rolls which are bulky and heavy. These rolls not only take up space in the warehouse but must also be transported to job sites. The insulation must then be cut piece-by-piece as needed for the respective duct. The cutting process is time consuming, labor intensive, and a possible labor liability. Measurements are typically taken from the duct designated for the install and can often be incorrect. Insulation segments that are cut too small, require re-cutting and wasting more material. Conversely, insulation segments that are cut too large, may lead inexperienced installers to compress the insulation, which compromises the thermal resistance or R value and effectiveness of the insulation.

Insulation wrapping often requires every side of the duct having a specific profile to require an individually cut piece of insulation. The cut insulation is then moved to a table for assembly and small pieces of adhesive are placed incrementally to anchor the insulation to the ductwork. The insulation is then pulled tight enough to seal the duct with more adhesive, but not tight enough to compress and lose the rated R value.

Thus, the field of HVAC duct insulation still has an unmet need for a quicker, simpler and more efficient installation technique. It would, therefore, be advantageous to develop a tool for more efficiently and properly cutting insulation segments for ductwork.

BRIEF SUMMARY OF THE DISCLOSURE

Briefly stated, one aspect of the present disclosure is directed to a modular fabrication tool for prefabricating insulation for a duct segment. The tool includes at least three interchangeable and detachably connected panels, each panel of the at least three panels corresponding to a respective side of the duct segment. Each panel includes at least one of a connecting bar extending beyond a periphery of the respective panel or a connecting track. The connecting bar of one panel is received by a connecting track of a neighboring panel when two neighboring panels are properly positioned, adjoined together, whereby a retaining pin of the tool is advanceable through aligned, respective apertures of the connecting track and the connecting bar received therein.

In one configuration, the modular fabrication tool includes least one rectangular panel.

In one configuration, the duct segment is a straight duct segment, and the at least three interchangeable and detachably connected panels comprise four interchangeable and detachably connected panels. In one such configuration, each panel defines a length of four feet. In one such configuration, each of the four panels defines a respective width, and a total width of the four panels corresponds to a cross-sectional perimeter of the straight duct segment and an additional four inches. In one such configuration, two of the four panels define a first width and another two of the four panels define a second width, wherein the first width is equal to one inch greater than a cross-sectional height of the straight duct segment and the second width is equal to one inch greater than a cross-sectional width of the straight duct segment. In one such configuration, the four panels are rectangular. In one such configuration, at least one of the four panels includes incremental one-inch markings thereon.

In one configuration, the duct segment is an elbow joint duct segment, and the at least three interchangeable and detachably connected panels comprise three interchangeable and detachably connected panels. In one such configuration one of the three panels is rectangular, and another two of the three panels have a shape of an annular sector. In one such configuration, opposing arc lengths of the two annular-sector shaped panels correspond to an external arc length of the joint duct segment and an internal arc length of the joint duct segment, respectively.

Briefly stated, one aspect of the present disclosure is directed to a method of prefabricating insulation for a duct segment using the modular fabrication tool of any of the previous configurations. The method includes assembling the tool by connecting the at least three panels together such that the connecting bar of one panel is received by the connecting track of the neighboring panel and the retaining pin is advanced through the aligned, respective apertures of the connecting track and the connecting bar received therein; placing the assembled tool upon a larger portion of insulation; cutting the insulation along at least one boundary of the assembled tool; and successively disconnecting one panel at a time and creasing, indenting or marking the insulation along an edge exposed from the disconnecting.

In one configuration, the cutting step comprises cutting the insulation along an entire external periphery of the assembled tool;

In one configuration, the method further includes attaching a strip of adhesive along a free terminal edge thereof.

In one configuration, at least one of the panels includes incremental one-inch markings thereon, and wherein the placing step comprises positioning the assembled tool upon the larger portion of insulation such that one of the markings is aligned with a terminal end of the larger portion of insulation and cutting the larger portion of insulation along the marking.

BRIEF DESCRIPTION OF THE SEVERAL VIEWS OF THE DRAWINGS

The following description of embodiments of the disclosure will be better understood when read in conjunction with the appended drawings. It should be understood, however, that the disclosure is not limited to the precise arrangements and instrumentalities shown. In the drawings.

DETAILED DESCRIPTION OF THE DISCLOSURE

Figure 1A:
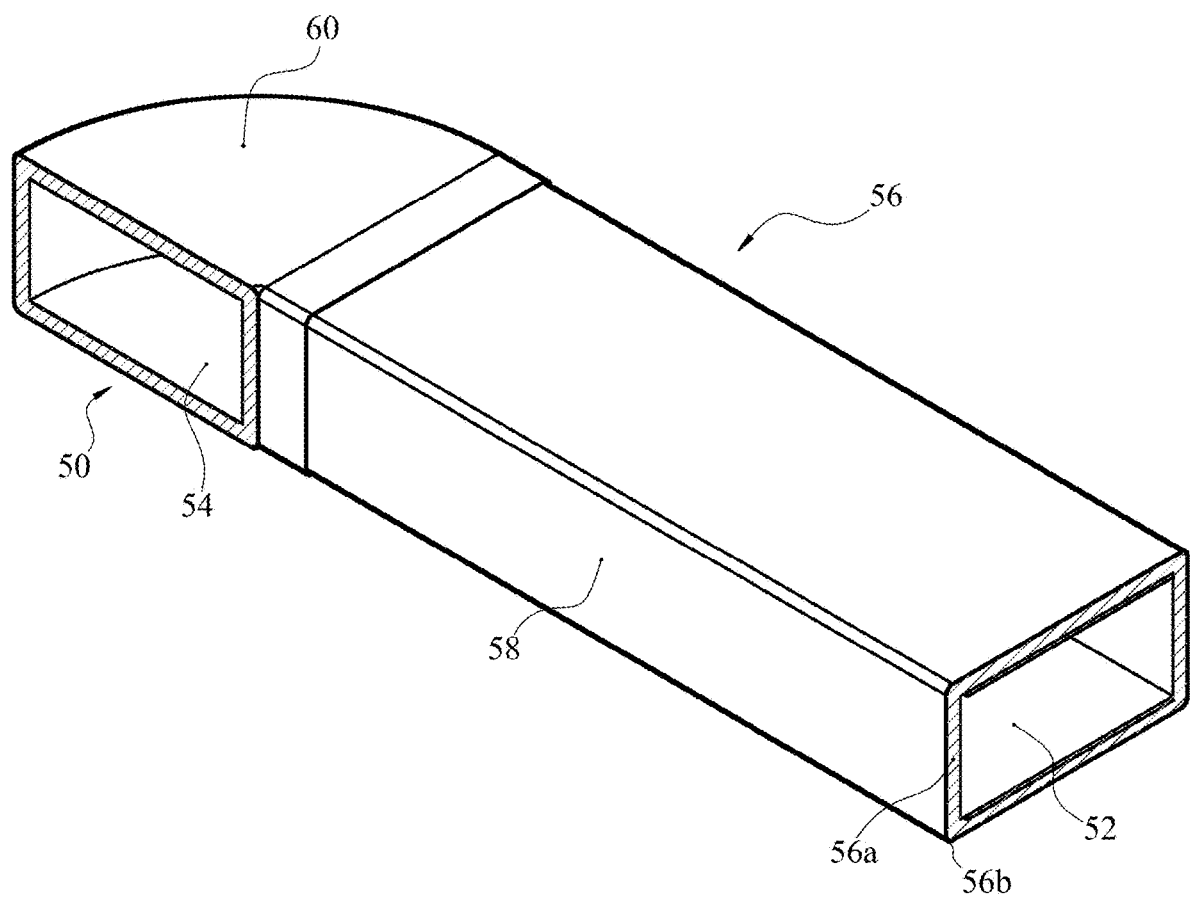
FIG. 1A is a perspective view of a conventional fiberglass insulation wrapped ductwork assembly including a straight duct segment and joint duct segment.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the modular, fabrication tool or prefabricated insulation wrap, and designated parts thereof, in accordance with the present disclosure. In describing the modular, fabrication tool or the prefabricated insulation wrap, the term proximal is used in relation to the upper end of the device and the term distal is used in relation to the bottom end of the device. Unless specifically set forth herein, the terms "a," "an" and "the" are not limited to one element, but instead should be read as meaning "at least one." The terminology includes the words noted above, derivatives thereof and words of similar import.

It should also be understood that the terms "about," "approximately," "generally," "substantially" and like terms, used herein when referring to a dimension or characteristic of a component of the disclosure, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 3A:
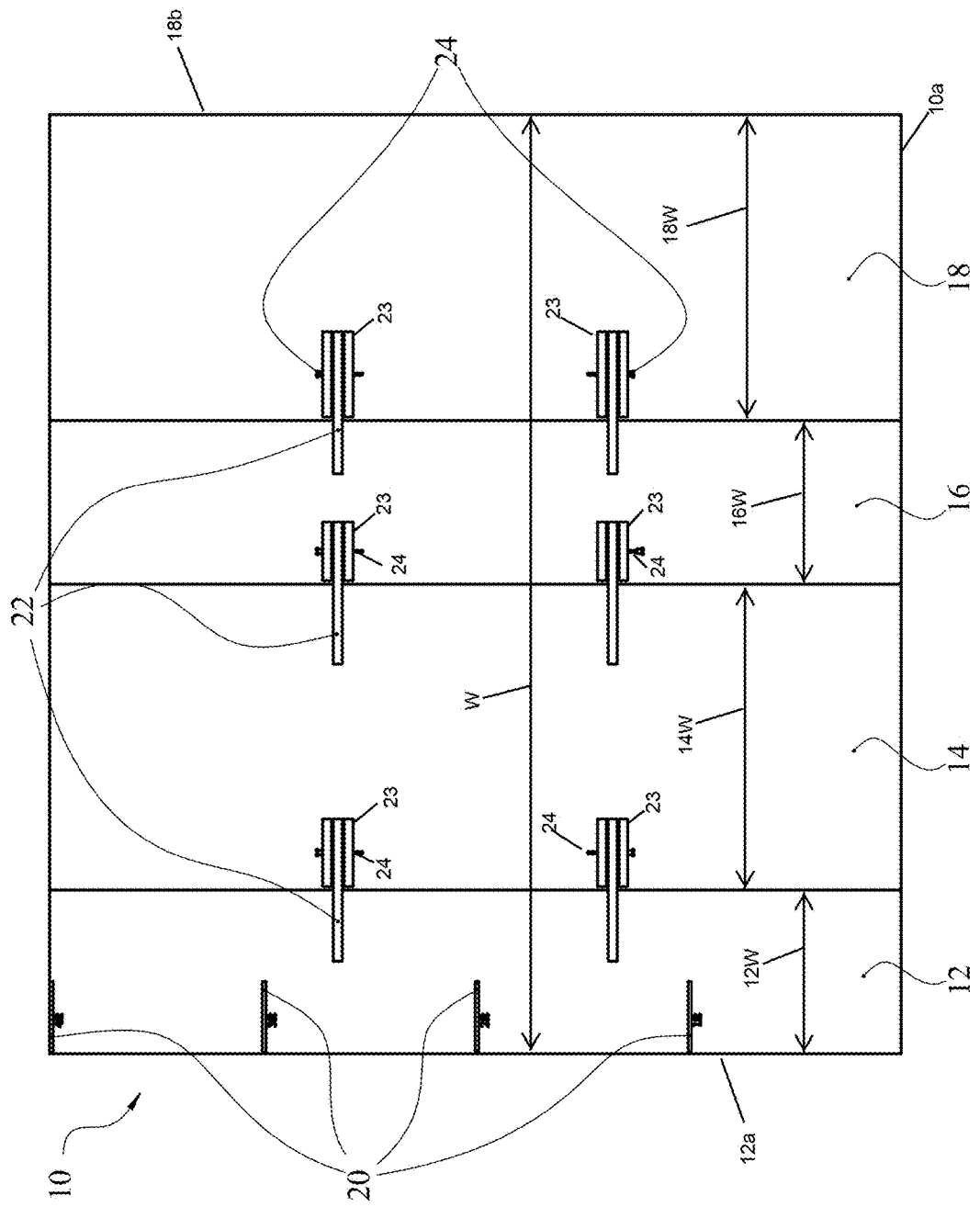
FIG. 3A is a top plan view of a modular, fabrication tool, according to a first embodiment of the present disclosure, in an assembled configuration.
Figure 3B:
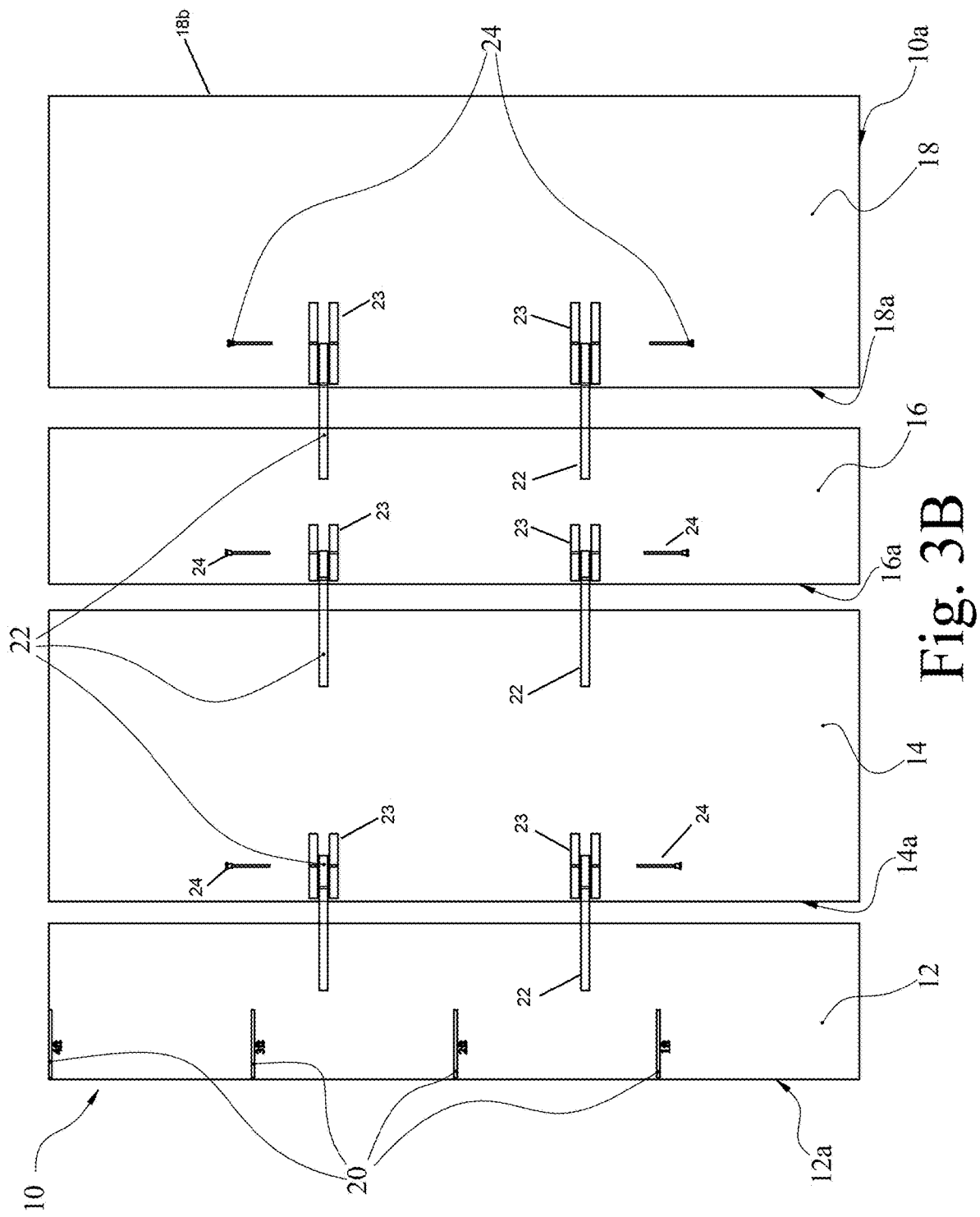
FIG. 3B is a top plan view of the modular, fabrication tool of FIG. 3A in an exploded, or disassembled, configuration.
Figure 4:
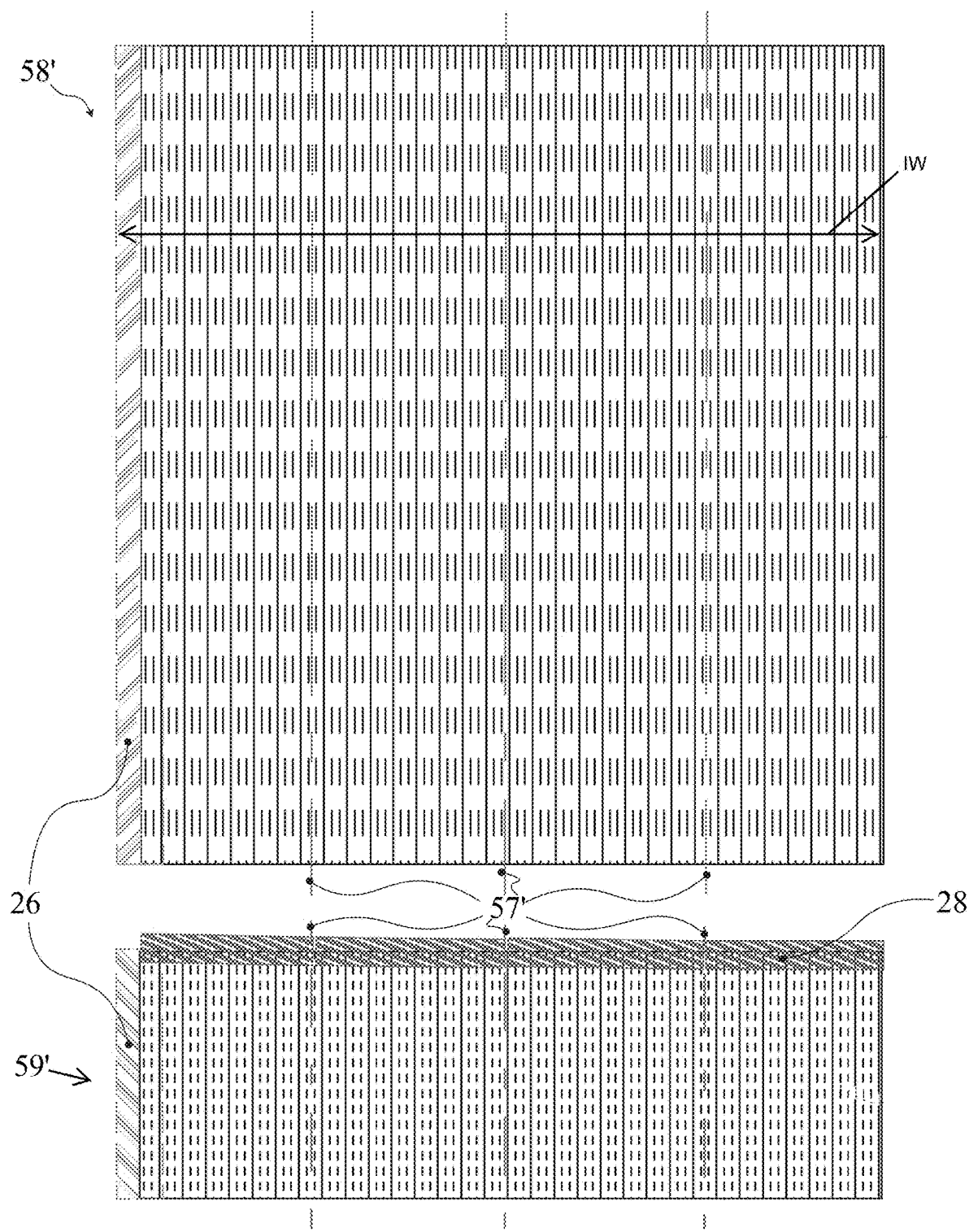
FIG. 4 is a top plan of a prefabricated insulation wrap, according to the present disclosure, for a straight duct segment.

Referring to the drawings in detail, wherein like numerals indicate like elements throughout, there is shown in FIGS. 3A-4, a modular, fabrication tool, generally designated 10, in accordance with an embodiment of the present disclosure for fabricating pieces of insulation wrap for ductwork, as described in further detail below. As should be understood by those of ordinary skill in the art, installing ductwork during a construction project requires insulation to be wrapped around the ductwork. The ductwork is generally wrapped in insulation with each duct section wrapped individually and then the insulated duct sections are joined together.

Figure 1B:
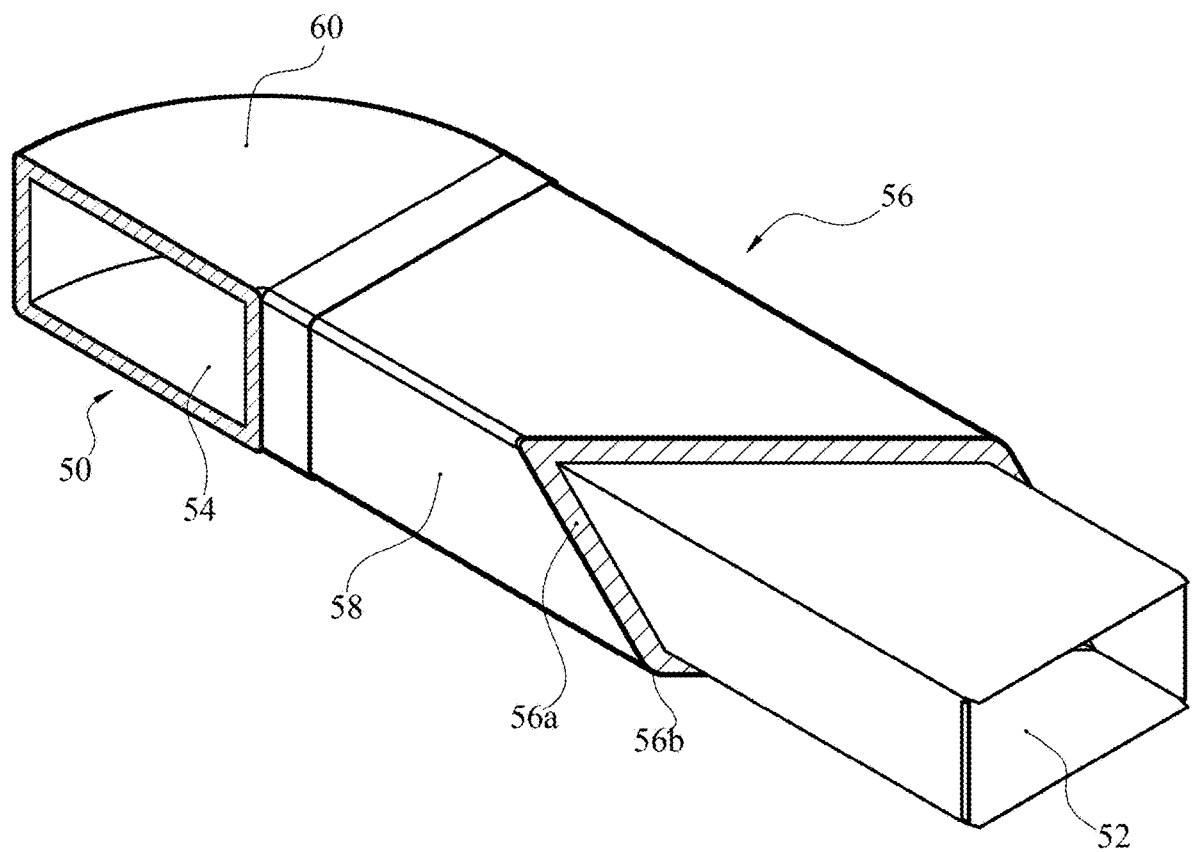
FIG. 1B is another perspective view of the conventional insulation wrapped ductwork assembly of FIG. 1A, with a partial view of the insulation wrapping and a partially exposed view of the ductwork.

Generally, insulation may take the form of fiberglass or bubble wrap. FIGS. 1A and 1B show a typical portion of ductwork 50, having a straight duct segment 52 and a joint segment 54, such as a 90-degree horizontal joint. Insulation 56 includes an insulation piece 58 wrapped around the straight duct segment 52 and an insulation piece 60 wrapped around the joint 54. The insulation pieces 58, 60 are sealed together, e.g. with tape, at the seam therebetween to maintain the thermal insulation property at the seam. In the illustrated configuration of FIG. 1A, the insulation 56 takes the form of fiberglass insulation, including an internal fiberglass insulating material 56a opposite the surface of the ductwork 50 and an external reflective covering 56b. These layers, in combination, maintain the thermal integrity; reflecting external energy, and maintain internal insulation of the ductwork.

Figure 1C:
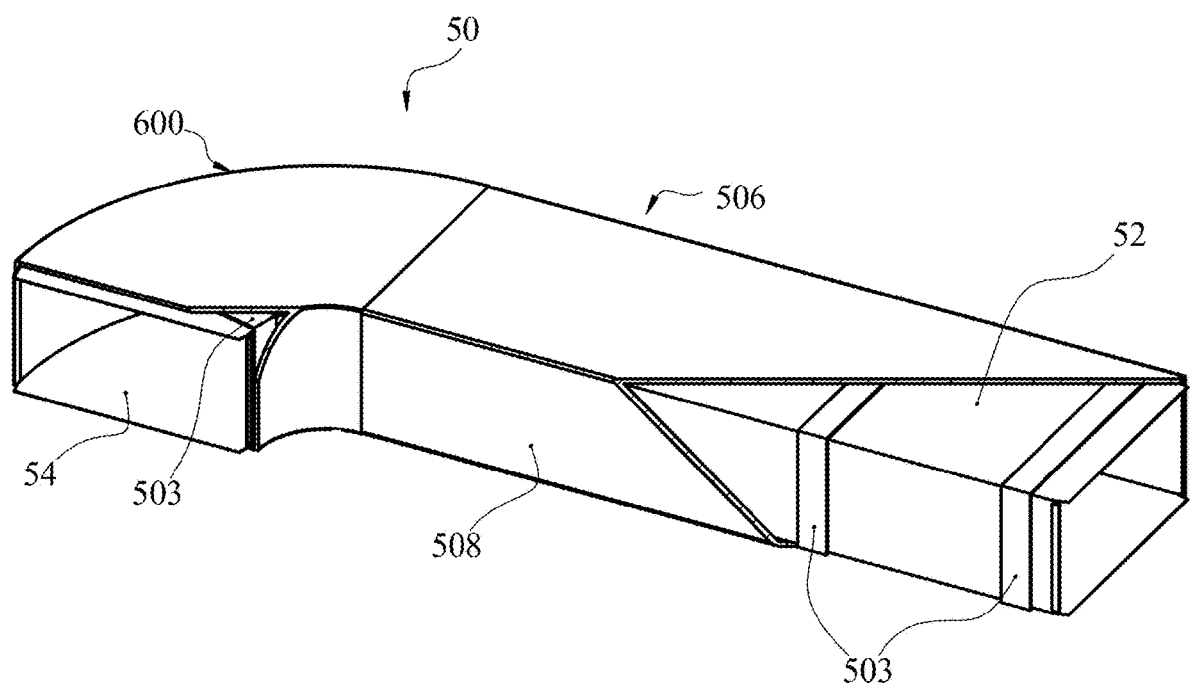
FIG. 1C is a perspective view of a conventional bubble wrap insulation wrapped ductwork assembly including a straight duct segment and joint duct segment, with a partial view of the insulation wrapping and a partially exposed view of the ductwork and spacers.
Figure 1D:
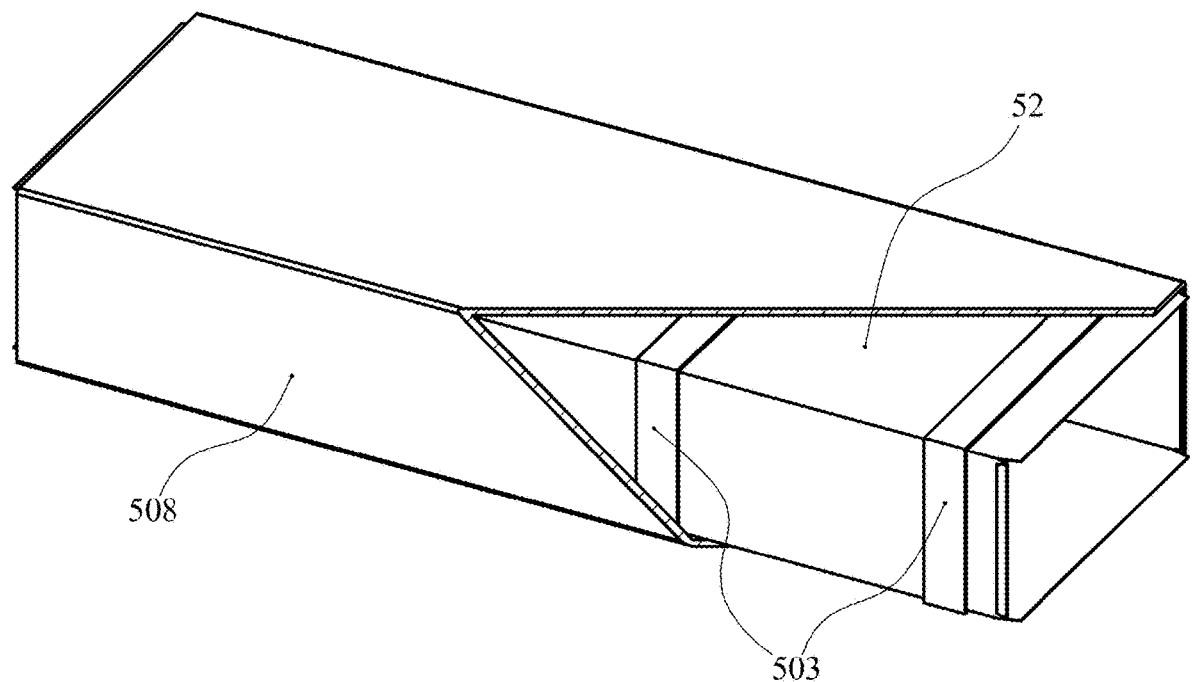
FIG. 1D is a perspective view of the straight duct segment and bubble wrap insulation of FIG. 1C, with a partial view of the insulation wrapping and a partially exposed view of the ductwork and spacers.
Figure 1E:
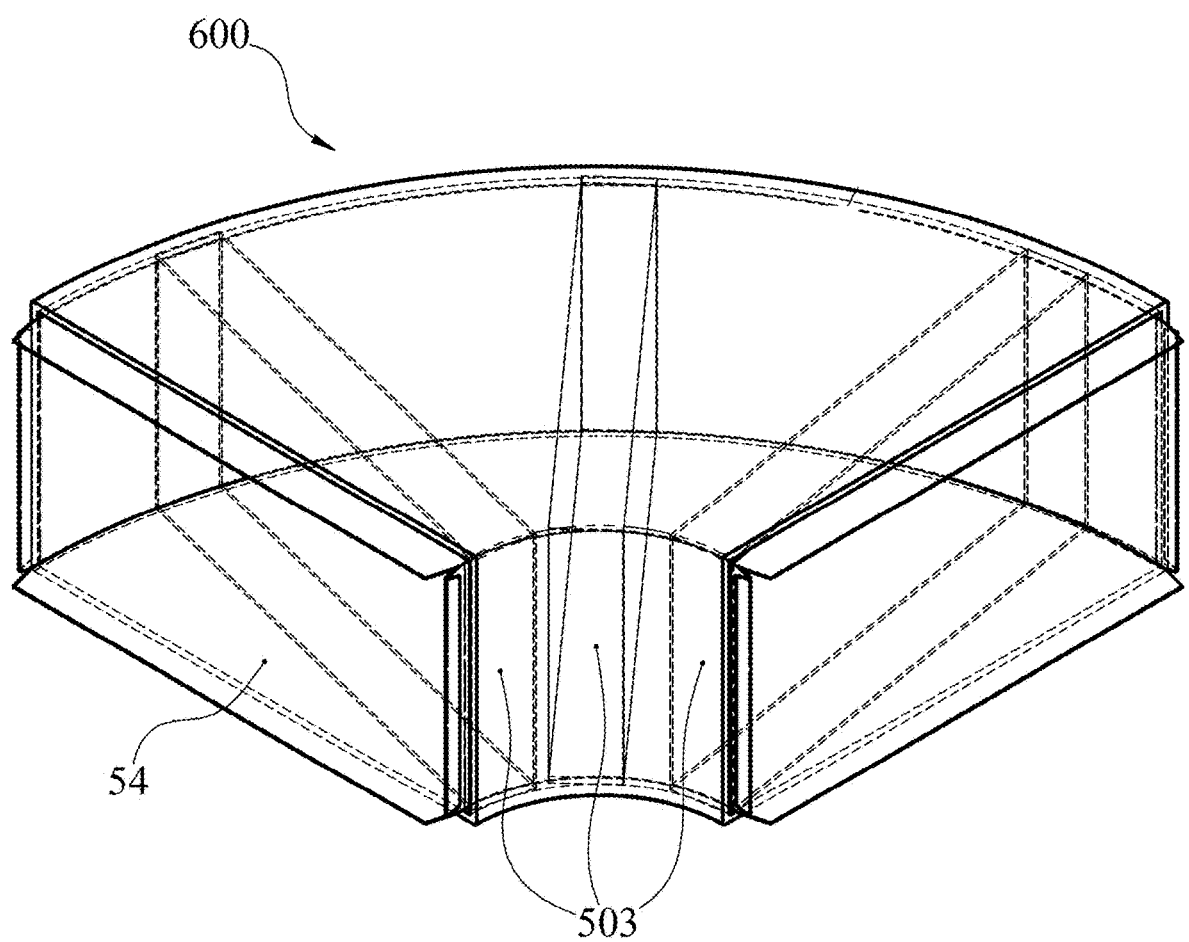
FIG. 1E is a perspective view of the joint duct segment and bubble wrap insulation of FIG. 1C, showing spacers underlying the bubble wrap insulation piece.

Conversely, FIGS. 1C-1E show a typical portion of ductwork 50, having a straight duct segment 52 and a joint segment 54, wrapped using bubble wrap insulation 506. When utilizing bubble wrap insulation 506, a spacer 503 extending about the ductwork 50 may be employed to create an air pocket that acts as another layer of insulation between the ductwork 50 and the bubble wrap insulation 506 in order to obtain the same level of heat insulation as some of the thicker fiberglass insulation. The cut out in FIG. 1C shows how the spacers 503 are distributed evenly and how the bubble wrap insulation 160 is placed over the spacers to create an air pocket. FIG. 1D shows a close up of a straight duct segment 52 with a bubble wrap insulation piece 508 wherein the insulation piece 508 allows room for the spacers 503 which are distributed evenly along the straight duct segment 52. FIG. 1E shows a 90-degree joint segment 54 with a bubble wrap insulation piece 600, wherein the insulation piece 600 allows room for the spacers 503. As can be seen, the spacers 503 for the joint are arrayed to maximize distance therebetween proximate the larger outside arc in order to create large pockets of air while still supporting the insulation piece 600.

Figure 2A:
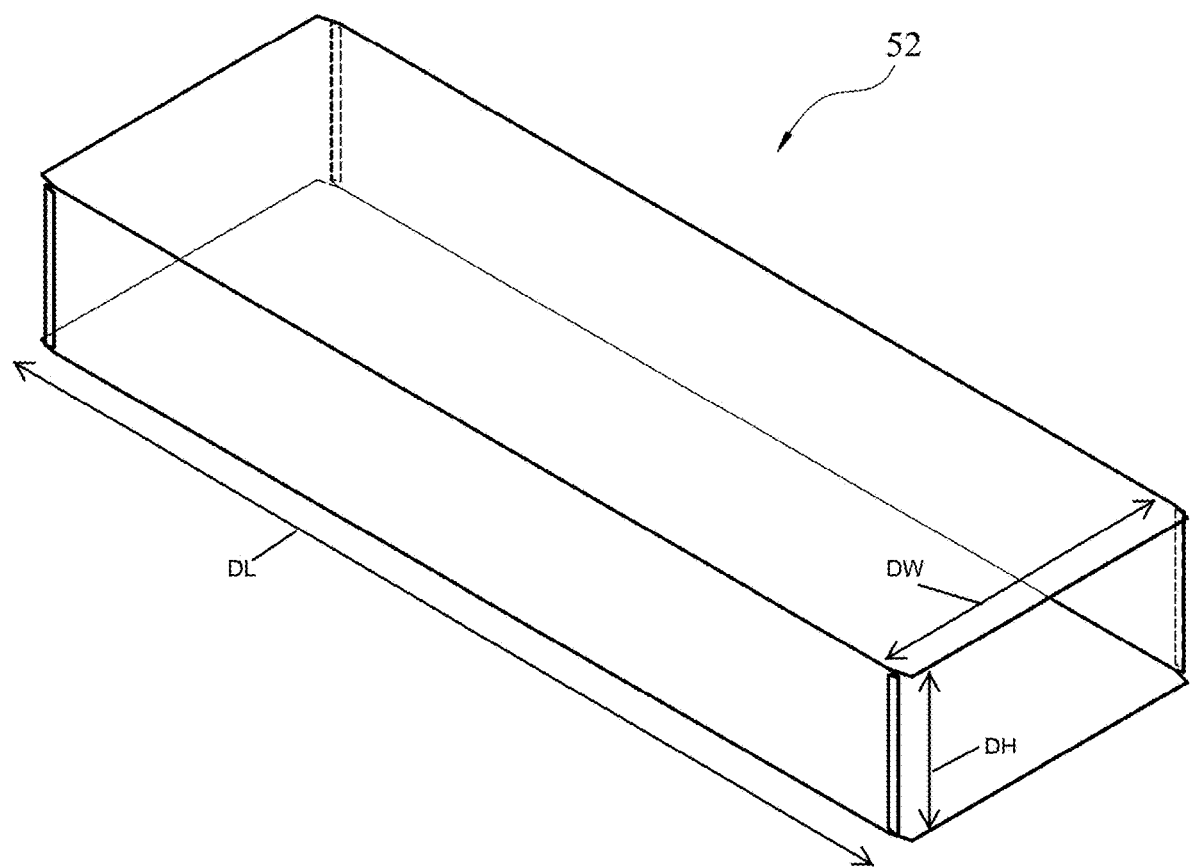
FIG. 2A is a perspective view of a conventional straight duct segment.

Generally, straight duct segments 52, such as shown best in FIGS. 1D and 2A, are manufactured in varying lengths DL, common lengths thereof being 4 feet or 5 feet. Individual ductwork for industrial buildings can reach lengths over 20 feet depending on the application. The height DH of the duct cross-section dictates the smallest possible dimensions of the duct section 52, whereas the cross-sectional width DW can increase in size. For example, an 8-inch height DH results in the smallest width DW equal to 8 inches but the width DW can increase up to 24 inches. A non-limiting cross-section of 8 inches by 16 inches is used for examples herein. The cross-sectional dimensions DL, DH and DW would be measured and/or provided for fabrication of an insulation wrap 58' via the modular, fabrication tool 10. The cross-sectional perimeter of a straight duct segment 52, i.e., 2*DH+2*DW, dictates the width IW of an insulation wrap 58' for a straight duct segment 52.

Figure 2B:
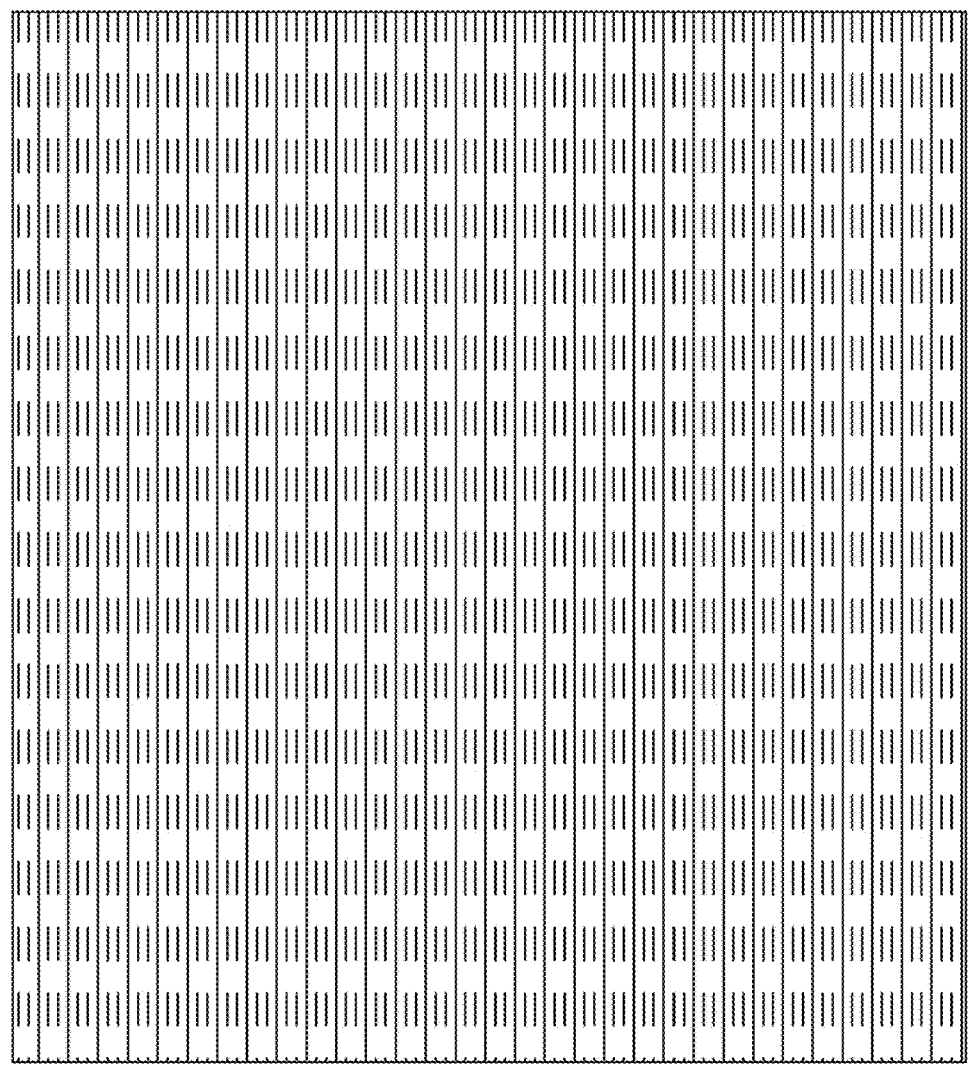
FIG. 2B is a top plan view of a conventional insulation piece for a straight duct segment.
Figure 2B:
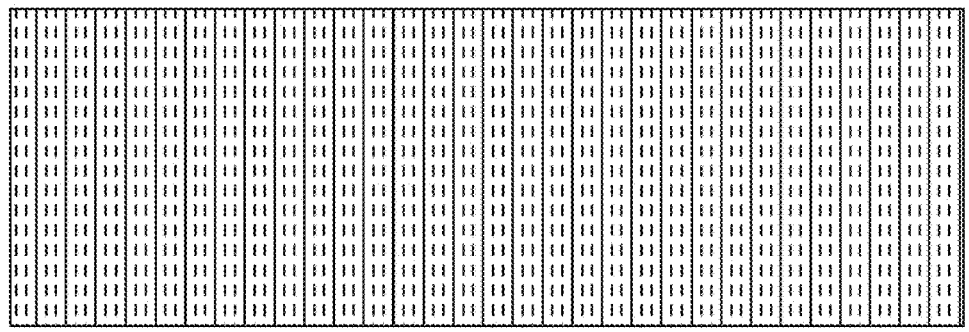

Generally, insulation rolls (not shown) are manufactured in standard 4 feet long by 6 feet wide dimensions. Conventional straight duct insulation pieces 58, as shown in FIG. 2B, are cut from insulation rolls. For straight duct segments 52 that are 4 feet long and greater, the entire length of the roll is used, and the only cut required from the insulation roll to obtain a usable straight duction insulation piece 58 would be a cut along the width of the insulation roll based on the total cross-sectional perimeter of the subject, straight duction section 52. As one example, an 8-inch by 16-inch cross-section would result in a cross-sectional perimeter of 48 inches, i.e., 2*8+2*16. As should be understood by those of ordinary skill in the art, an additional one inch per corner, i.e., 4 inches, is added to account for the insulation bending around the duct corners, bringing the total required width of the insulation piece 58 to 52 inches.

For straight duct segments 52 that are longer than 4 feet long, at least one additional insulation piece 59 is cut to account for the remaining length of the duct section 52. Accordingly, it may require multiple insulation pieces 58, 59 all cut to the same width, to wrap a straight duct segment 52 that is longer than 4 feet. FIG. 2B shows an example of a typical cut insulation piece 58 having a length equal to the standard 4-foot length of the insulation roll, and an additional cut insulation piece 59 which would be used to fully wrap a straight duct segment 52 over 4 feet long. For example, a 5-foot long straight duct segment 52 having an 8 inch by 16-inch cross-section would require a second insulation piece 59 having a length of one foot and a width of 52 inches in order to fully wrap the 5-foot straight duct.

FIGS. 3A and 3B show a modular, fabrication tool 10, according to a first embodiment of the present disclosure, configured to construct a prefabricated insulation wrap 58', 59' (FIG. 4) for a straight duct segment 52 (FIG. 2A). The tool 10 includes four interchangeable and detachably connected panels or sections 12, 14, 16 and 18, each panel corresponding to a respective side of a straight duct segment 52. For example, the first panel 12 and third panel 16 may define respective widths 12W, 16W based on the height of the sides of the straight duct segment 52 defining the cross-sectional height DH, e.g., 8 inches. The second panel 14 and the fourth panel 18 may define respective widths 14W, 18W based on the width of the sides of the straight duct segment 52 defining the cross-sectional width DW. As previously described, one additional inch is added to each side to account for the prefabricated insulation wrap bending around the duct corners. That is, for example, the first panel 12 and third panel 16 may each define respective widths 12W, 16W equal to the height DH of the straight duct segment 52 plus one inch. The second panel 14 and the fourth panel 18 may each define respective widths 14W, 18W equal to the width DW of the straight duct segment 52 plus one inch.

One or more of the panels 12, 14, 16, and 18 may include incremental one-inch markings 20. In the illustrated configuration of FIGS. 3A, 3B, the first panel 12 includes the markings 20, but the disclosure is not so limited. The markings 20 are spaced apart in one-inch increments as most standard straight duct segments define a length in factors one inch. As should be understood by those of ordinary skill in the art, however one or more of the panels 12, 14, 16, and 18 may include markings at increments in more or less than one inch, such as, for example, without limitation, in one-half inch increments. The markings 20 are beneficial for cutting a prefabricated insulation wrap 58' or 59' that is not four feet long, e.g., for a straight duct segment 52 greater than 4 feet in length (and not a factor of 4 feet in length) or shorter than 4 feet in length.

FIG. 3A shows the modular, fabrication tool 10 in an assembled configuration. The total width W accounts for the total cross-sectional perimeter of the subject, straight duct segment 52. That is, appropriate panels 12 and 16 of respective widths 12W and 16W, corresponding to the height DH of the subject, straight duct segment 52 (as previously described), may be selected, and panels 14 and 18 of respective widths 14W and 18W, corresponding to the width DW of the subject, straight duct segment 52 (as previously described), may be selected. The selected panels 12, 14, 16 and 18 may be subsequently assembled together, such that the total width W of the assembled modular, fabrication tool 10 corresponds to the total cross-sectional perimeter of the subject, straight duct segment 52 plus four inches, accounting for the four corners of the straight duct segment 52.

In one configuration, as shown best in FIGS. 3A and 3B, each panel 12, 14, 16 and 18 may have at least one connecting bar 22 extending beyond at least one side of the respective panel, at least one connecting track 23, or both. Each connecting bar 22 includes at least one through-hole (not shown) extending therethrough and each connecting track 23 also includes at least one through-hole (not shown) extending therethrough. A connecting track 23 is positioned along a panel such that an opposing connecting bar 22 from a neighboring panel extends into the connecting track 23 when the two panels are properly positioned side-by-side in a vertically aligned manner. In the illustrated configuration, the connecting bars 22 project from a right side of a panel and the connecting tracks 23 are positioned along the left side of a panel, but the disclosure is not so limited. To assemble the modular, fabrication tool 10, the selected panels 12, 14, 16 and 18 are positioned successively in order of the successive sides of the straight duct segment 52, e.g., without limitation, a panel corresponding to a left side of the straight duct segment 52, followed by a panel corresponding to a bottom side of the straight duct segment 52, followed by a panel corresponding to a right side of the straight duct segment 52, followed by a panel corresponding to a top side of the straight duct segment. The panels are positioned in a vertically aligned, adjoining manner, whereby the connecting bars 22 of respective neighboring panels extend into the opposing connecting tracks 23 of the neighboring panel and the respective through-holes thereof are axially aligned. A selectively removable retaining pin 24 may be advanced through each set of aligned through-holes to connect the panels together. As should be understood by those of ordinary skill in the art, however, the panels 12, 14, 16 and 18 may be removably attached to one another in a successive, vertically aligned and adjoining manner via any removable attached means currently known or that later become known.

To construct a prefabricated insulation wrap 58' of four feet in length for a straight duct segment 52, the assembled, modular fabrication tool 10 (FIG. 3A) is positioned upon an insulation roll or other larger portion of insulation, and a free terminal side 12a of the first panel 12, i.e., a first edge 12a of the assembled, modular fabrication tool 10 along the width dimension is aligned with a free terminal end of the insulation roll or other larger portion of insulation (along the width dimension). The insulation roll or other larger portion of insulation is subsequently cut along the other free terminal side 18b of the fourth panel 18, i.e., a second edge 18b of the assembled, modular fabrication tool 10. The cutting may be performing using any number of manufactured cutting techniques known by those of ordinary skill in the art, such as, for example, without limitation, via laser cutting, hydraulic press cutting, simple knife drawing along the edge, a combination thereof, or the like. Subsequently, each panel is disconnected, and the prefabricated insulation wrap 58' indented, creased, or marked at the exposed edges 14a, 16a, 18a respectively for installation registration. For example, after cutting the total width, the first panel 12 is disconnected from the second panel 14 and the prefabricated insulation wrap 58' is creased/etc. along the exposed edge 14a of the second panel 14. Subsequently, the second panel 14 is disconnected from the third panel 16 and the prefabricated insulation wrap 58' is creased/etc. along the exposed edge 16a of the second third panel 16. Finally, the third panel 16 is disconnected from the fourth panel 18, and the prefabricated insulation wrap 58' is creased/etc. along the exposed edge 18a of the fourth panel 18.

To construct a prefabricated insulation wrap 58' of less than four feet in length or to create an additional prefabricated insulation wrap 59' of less than four feet in length, the assembled, modular fabrication tool 10 is positioned upon an insulation roll/other larger portion of insulation and the required length is measured using the incremental markings 20. That is, the appropriate marking 20 is aligned with a top edge of the insulation roll/other larger portion of insulation and the insulation roll/other larger portion of insulation is cut (in a manner as previously described) along a bottom edge 10a of the tool 10. Subsequently, or beforehand, the width 1W dimension is cut, and the wrap 58' or 59' is creased, as previously described.

FIG. 4 shows an example of the prefabricated insulation wrap 58' for wrapping four feet in length of a straight duct segment 52, as well as an example of the additional prefabricated insulation wrap 59' of less than four feet in length, each of the prefabricated insulation wraps 58', 59' having the formed creases 57'. The prefabricated insulation wraps 58', 59' may include a strip of adhesive 26 thereon, which typically has a peelable backing, attached at a free, terminal sealing edge hereof. Additionally, or alternatively, the adhesive may be achieved via any number of methods, currently known or that later become known, such as sewing, chemical sealing, a combination thereof or the like. As previously described, indents/creases/markings, 57' are used to indicate where to fold and line up the prefabricated insulation wraps 58', 59' with the duct corners when installing. This allows for fast and hassle-free registration on jobsites. The at least one additional prefabricated insulation wrap 59' is needed to cover straight duct segments 52 longer than 4 feet. The additional prefabricated insulation wrap 59' may include an additional adhesive strip 28 on a top or bottom side thereof for attachment to the first prefabricated insulation wrap 58'. Additionally, or alternatively the first prefabricated insulation wrap 58' may include the additional adhesive strip 28 on a top or bottom side thereof. Advantageously, the prefabricated insulation wrap(s) 58', 59' are foldable, e.g., along the indents, creases, markings, a combination thereof, or the like, in a smaller, folded and compact configuration, for increased efficiency of any of storage, packing or shipping. This ability to be easily packed also allows for multiple different prefabricated insulation wrap(s) 58', 59' (as well as prefabricated insulation wrap(s) of the subsequent embodiments) for different duct segments to be packaged together, making the storage, shipping, and insulation for a project faster and easier.

Figure 5A:
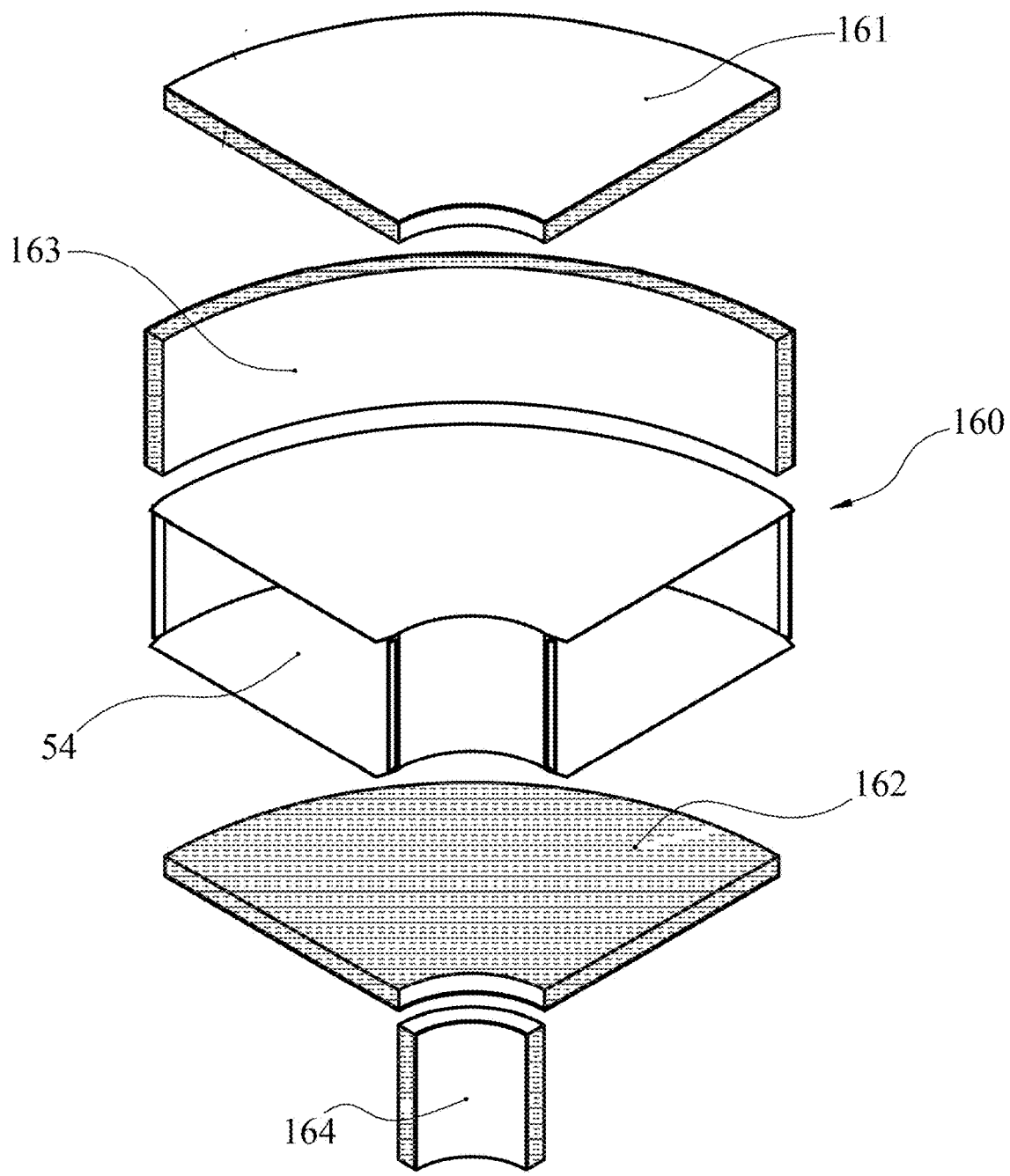
FIG. 5A is an exploded, perspective view of conventional insulation pieces for wrapping a joint duct segment.
Figure 5B:
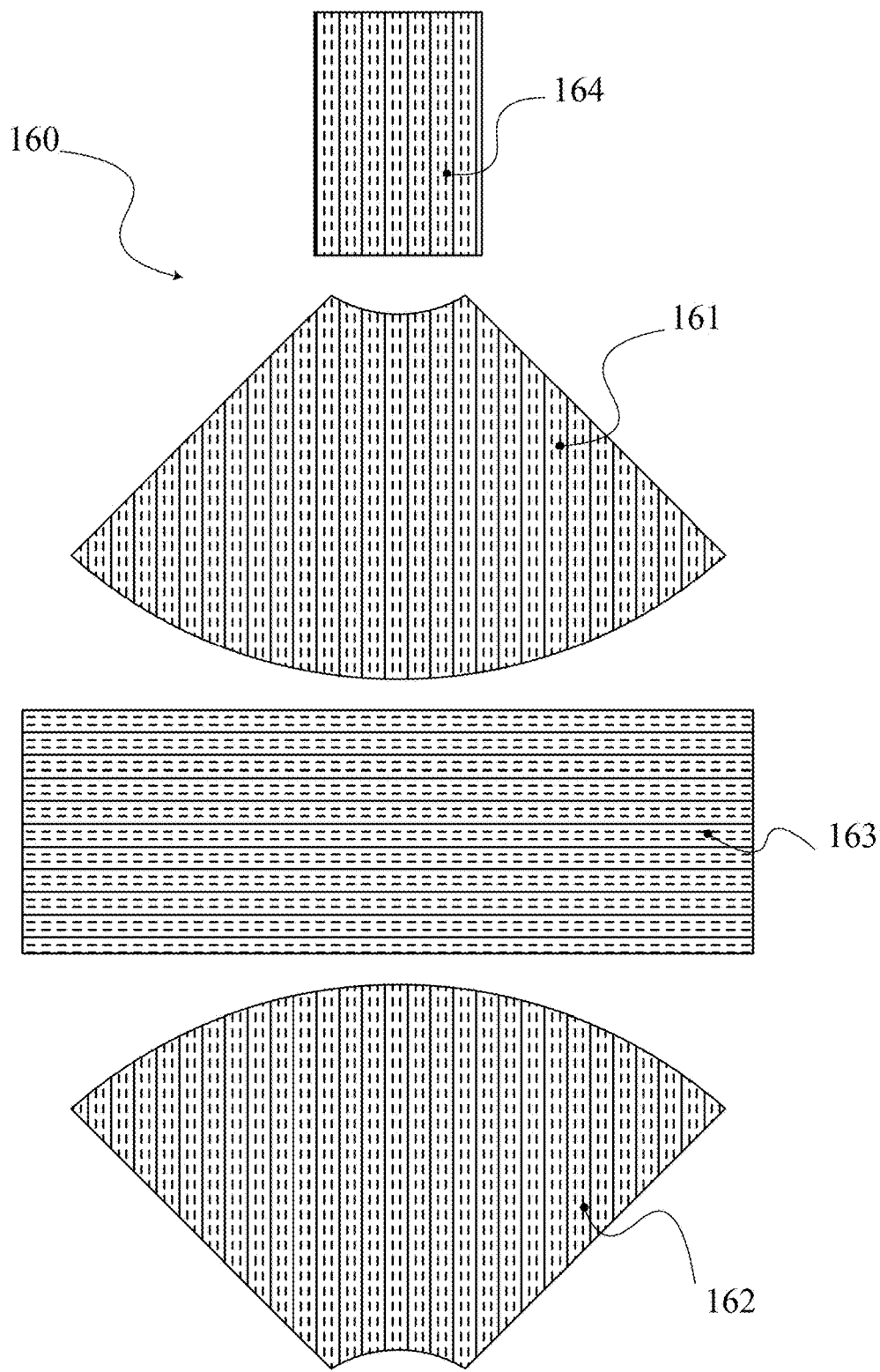
FIG. 5B is a top plan view of the conventional insulation pieces of FIG. 5A.

Turning to FIGS. 5A and 5B, an exploded view of an elbow joint duct segment 54 is shown, with conventional insulation pieces 160, including a top piece 161, a bottom piece 162, a radially exterior piece 163 and a radially interior piece 164. Conventionally, each insulation piece is cut individually and assembled as laid out in FIG. 5B.

Figure 6A:
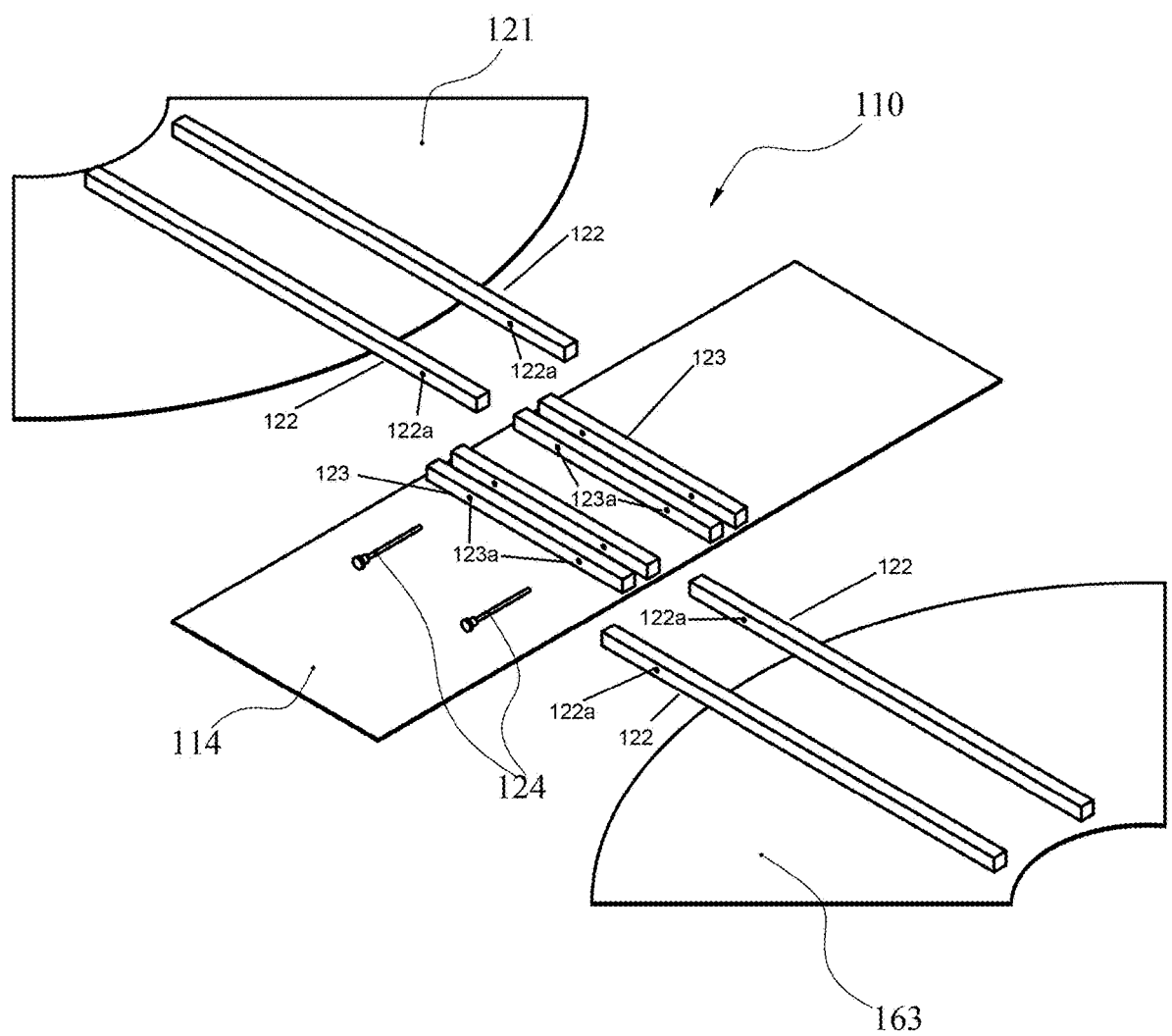
FIG. 6A is a perspective view of a modular, fabrication tool, according to a second embodiment of the present disclosure, in a disassembled configuration.
Figure 6B:
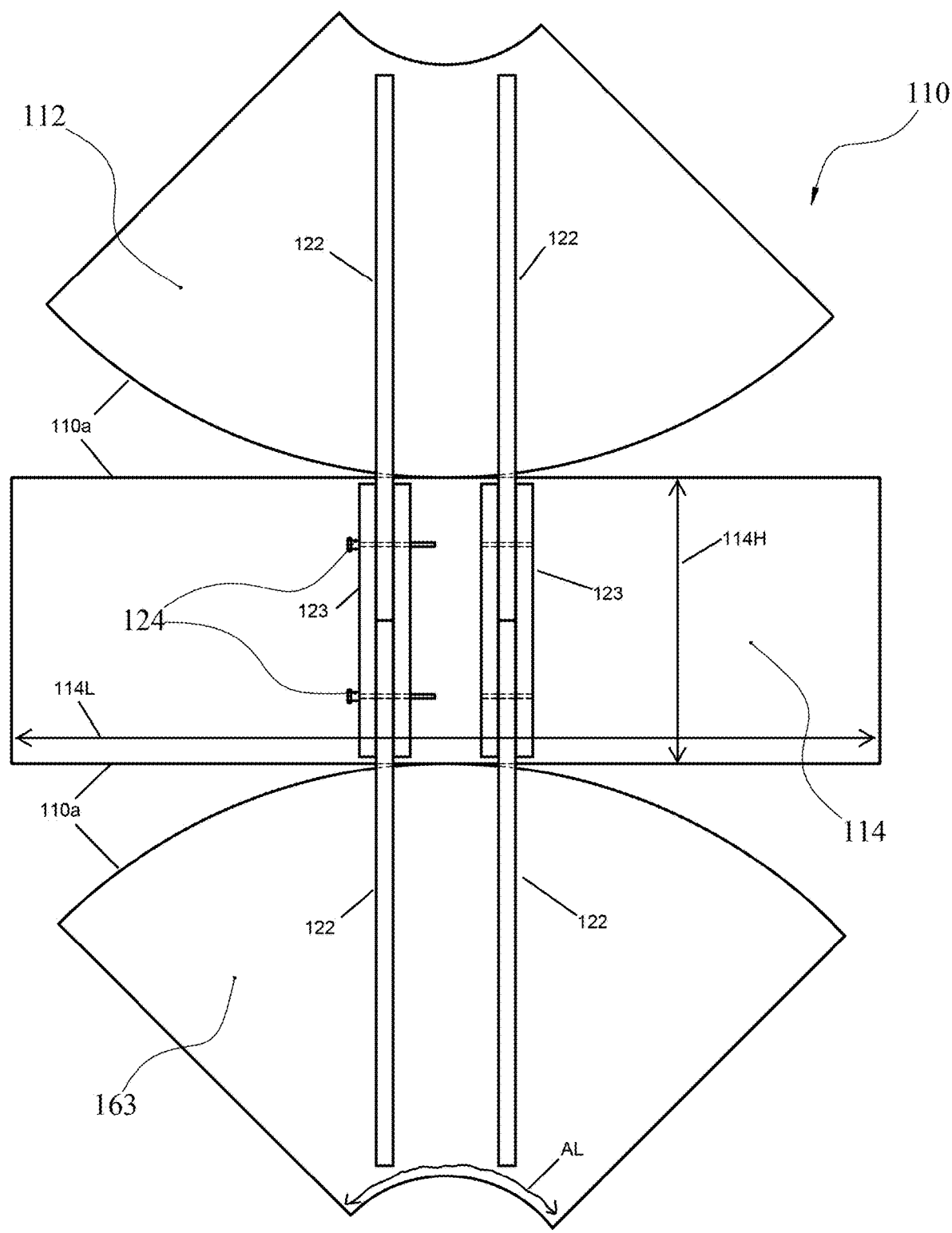
FIG. 6B is a top plan view of the modular, fabrication tool of FIG. 6A, in an assembled configuration.
Figure 6C:
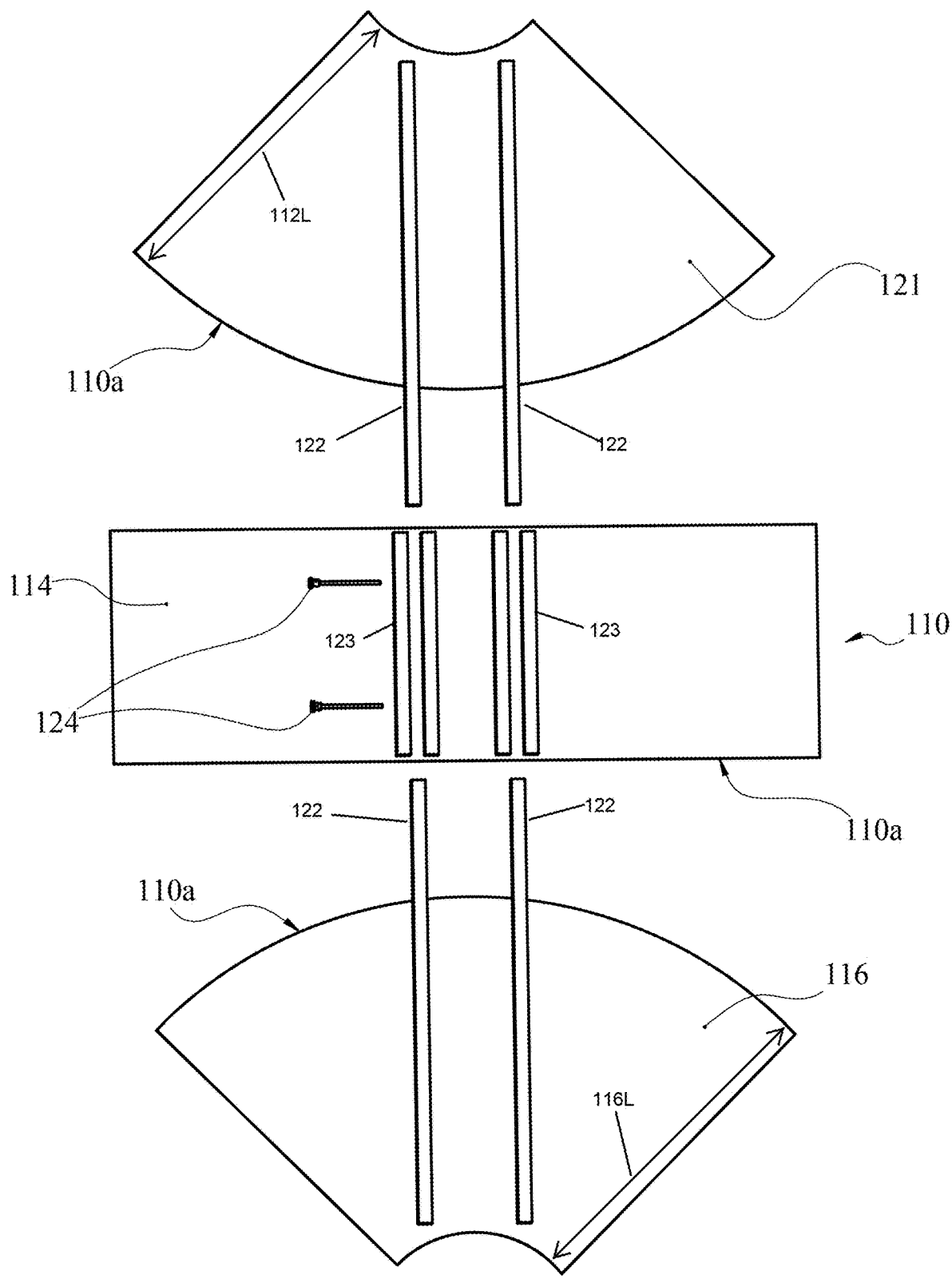
FIG. 6C is a top plan view of the modular, fabrication tool of FIG. 6A, in a disassembled configuration.

FIGS. 6A-6C illustrate a second embodiment of the modular fabrication tool 110. The reference numerals of the present embodiment are distinguishable from those of the above-described embodiment by a factor of one-hundred (100), but otherwise indicate the same elements as indicated above, except as otherwise specified. The modular fabrication tool 110 of the present embodiment is similar to that of the earlier embodiment. Therefore, the description of certain similarities between the embodiments may be omitted herein for the sake of brevity and convenience, and, therefore, is not limiting.

A primary difference between the first and second modular fabrication tools 10 and 110 is that the modular fabrication tool 10 is configured for straight duct segments 52 and the modular fabrication tool 110 is configured for elbow joint duct segments 54. As shown, the modular fabrication tool 110 includes a first panel 112, a second panel 114 and a third panel 116. As shown, the first and third panels 112, 116 generally take the shape of an annular sector, e.g., generally fan shaped, whereas the second panel 114 is generally rectangular. Similarly to the fabrication tool 10, the panels 112, 114, and 116 are interchangeable and detachably connected, with each panel corresponding to a respective surface of the elbow joint duct segment 54. For example, the first panel 112 may correspond to a top surface of the elbow joint duct segment 54, the second panel 114 may correspond to a radially exterior surface of the elbow joint segment 54 and the third panel 116 may correspond to a bottom surface of the elbow joint segment 54.

FIGS. 6A and 6C show the modular, fabrication tool 110 in a disassembled configuration. As shown, the first and third panels 112, 116 each have at least one connecting bar 122 extending beyond the periphery of the respective panel and the second, middle panel 114 has corresponding connecting tracks 123. As should be understood, however, the second panel 114 may alternatively include the connecting bars and the first and third panels 112, 116 may include the connecting tracks, or a combination thereof. As shown best in FIG. 6A, each connecting bar 122 includes at least one through-hole 122a extending therethrough and each connecting track 123 also includes at least one through-hole 123a extending therethrough. The connecting track 123 is positioned along the second panel 114 such that the opposing connecting bars 122 from each of the neighboring panels 112, 116 extends into the connecting track 123 when the panels 112, 114, 116 are properly positioned side-by-side in a mirrored manner about the second panel 114.

To assemble the modular, fabrication tool 110, as shown in FIG. 6B, appropriate panels 112, 114 and 116 are initially selected. Because a joint duct segment 54 is connected to a straight duct segment 52, measurements of the straight duct segment cross-sectional perimeter correspond to measurements of the joint duct segment 54 cross-section perimeter. That is, the second panel 114 defines a height 114H equal to the height DH of the straight duct segment 52. The second panel 114 defines a length 114L equal to the radially external arc length of the joint duct segment 54. As should be understood by those of ordinary skill in the art, the radially external arc length is a known, disclosed value based on the duct manufacturer. As for the first and third panels 112, 116, they define respective side lengths 112L, 116L equal to the width DW of the straight duct segment 52. The opposing arc lengths thereof are equal to the radially external and internal arc lengths of the joint duct segment 54, which, as previously described, are known, disclosed values based on the duct manufacturer.

Upon selecting the appropriate panels 112, 114, 116, the connecting bars 122 of the first and third panels 112, 116 are positioned into the connecting tracks 123 of the second panel 114, such that and the respective through-holes 122a, 123a are aligned. A selectively removable retaining pin 124 may be advanced through each set of aligned through-holes 122a, 123a to connect the panels together. As should be understood by those of ordinary skill in the art, however, the panels 112, 114 and 116 may be removably attached to one another via any removable attached means currently known or that later become known.

Figure 7:
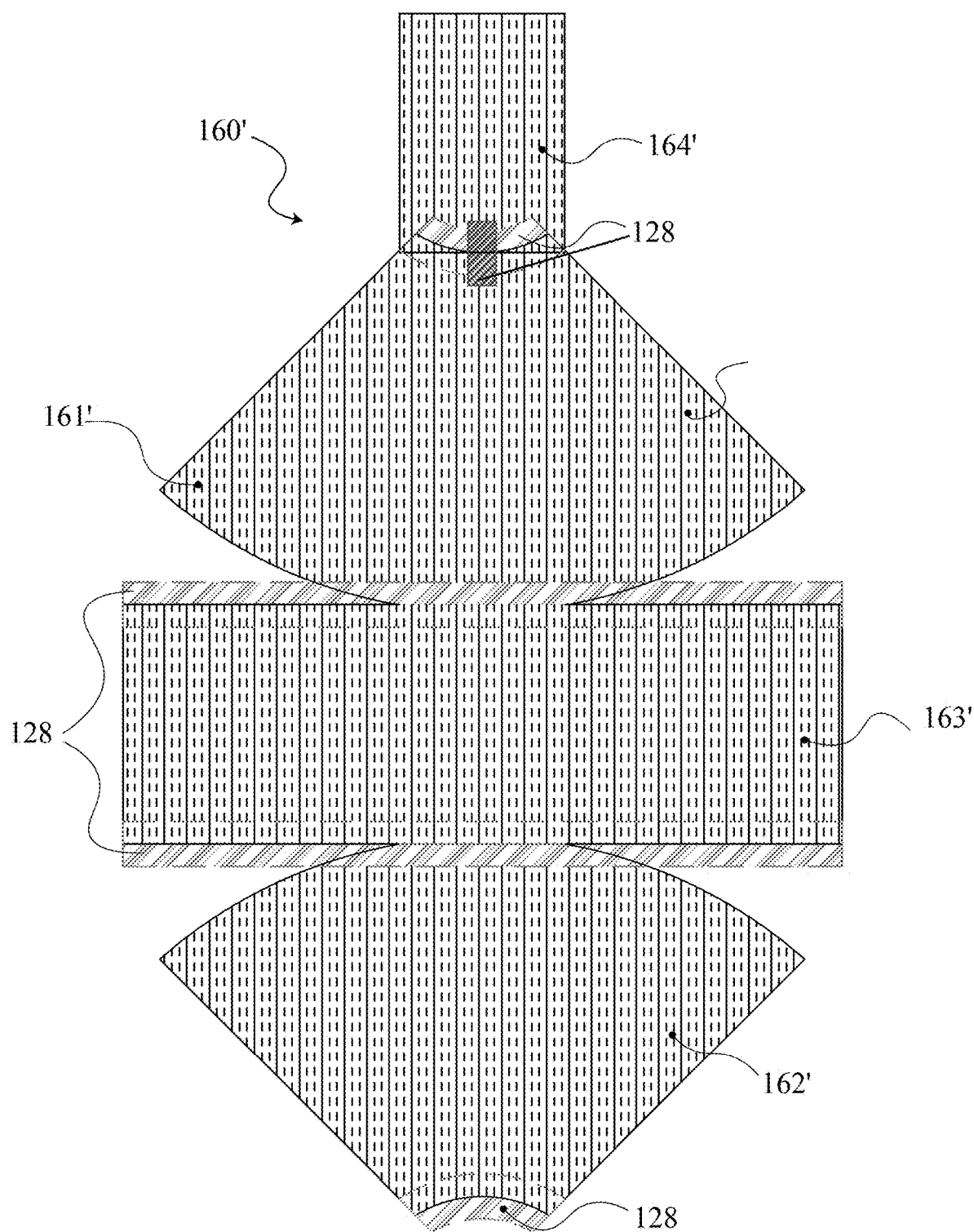
FIG. 7 is a top plan view of a prefabricated insulation wrap, according to the present disclosure, for an elbow joint duct segment.

To construct a prefabricated insulation wrap 160' for a 90° elbow joint duct segment 54, as shown in FIG. 7, appropriate sized panels are selected and the modular, fabrication tool 110 is assembled. The tool 110 is then placed upon a flattened portion of an insulation roll or other larger portion of uncut insulation, which is subsequently cut (in a manner as previously described) along the peripheral outline 110a of the assembled, modular fabrication tool 11, while leaving the adjoining portions between the panels 112, 114, 116 uncut to form the main body of the prefabricated insulation wrap 160', i.e., a single connected piece of insulation consisting of sections 161', 163', and 162' as show in FIG. 7. Subsequently, each panel is successively disconnected (in a manner as previously described with respect to the tool 10), and the prefabricated insulation wrap 160' is indented, creased, or marked at the points of contact between panels along the exposed edges of the tool 110 for installation registration.

In view of the complex shape of the outer arcs on the first and third panels 112, 116, which correspond to the peripheral inner surface of the 90° elbow joint duct segment 54, an inside insulation piece 164' is cut (in a manner as previously described) separately, using the same height dimension as the height IH of the middle panel 114 (corresponding to the radially exterior piece 163') and the arc length AL of the first and third panels 112, 116. The inside insulation piece 164' is attached to the rest of the prefabricated insulation wrap 160' when adhesive 128 is added to complete the prefabricated insulation wrap 160'.

FIG. 7 shows the prefabricated insulation wrap 160'. As previously described, the insulation panels 161', 162', and 163' are formed of one piece while the panel 164' is attached after separately cutting to form the prefabricated insulation wrap 160' for the elbow joint duct segment 54. The elbow joint duct segment 54 also highlights an advantage of the prefabricated insulation wrap 160'. That is, typical fabrication for insulation for a joint duct is significantly more time consuming than for a straight duct and generates more waste on job sites as joints have complex geometries which are also more time consuming to cut out. Where the typical insulation is cut on site, the prefabricated insulation is cut in a manufacturing facility where waste can be easily managed.

Typical insulation, for example, is installed by first adhering one section to the duct segment with small strips of adhesive, then a subsequent piece is held to the duct segment with an edge touching the already applied piece and sealed with another strip of adhesive. This is repeated for all edges, with sealed edges ending up looking similar to those shown in FIG. 7. This process is labor intensive for complex geometries as the effort of holding the insulation in place and sealing correctly can result in errors and wasted material if needing to be redone. Alternatively, the prefabricated insulation wrap 160' of the present disclosure is simply folded around the joint duct segment 54, with the folds lining up with the duct joint corners along the indents/creases, and the peelable adhesive 128 backing is removed on only connecting edge, e.g., that of the segment 164' and segment 162'. By sealing that edge the prefabricated insulation wrap 160' is held in place allowing for the remaining adhesive strips 128 along the rest of the edges to be easily peeled for attachment and sealing.

Figure 8A:
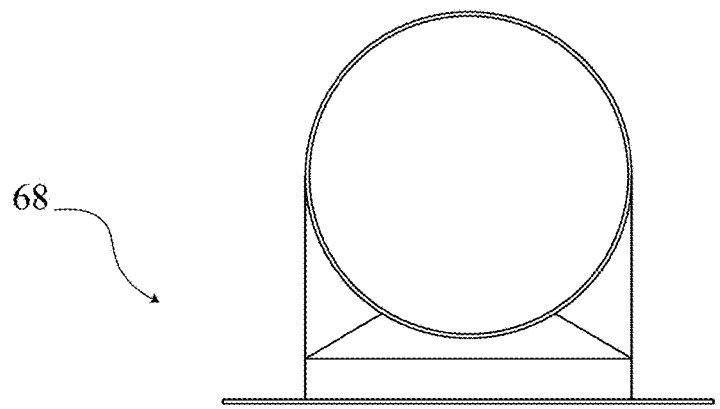
FIG. 8A is a front elevational view of a conventional transition joint duct segment.
Figure 8B:
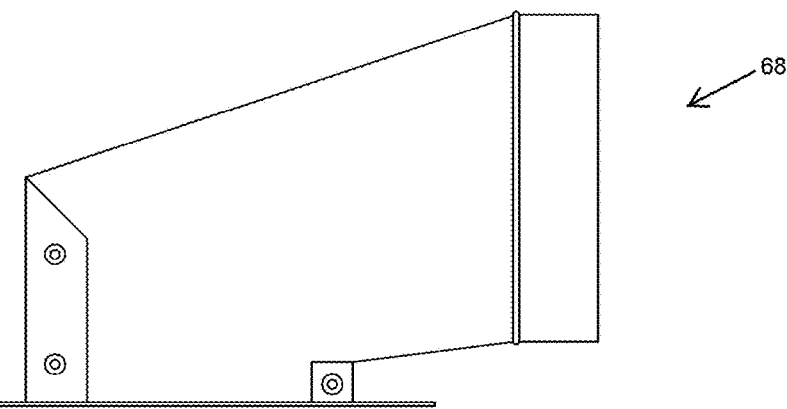
FIG. 8B is a side elevational view of the conventional transition joint duct segment of FIG. 8A.
Figure 8C:
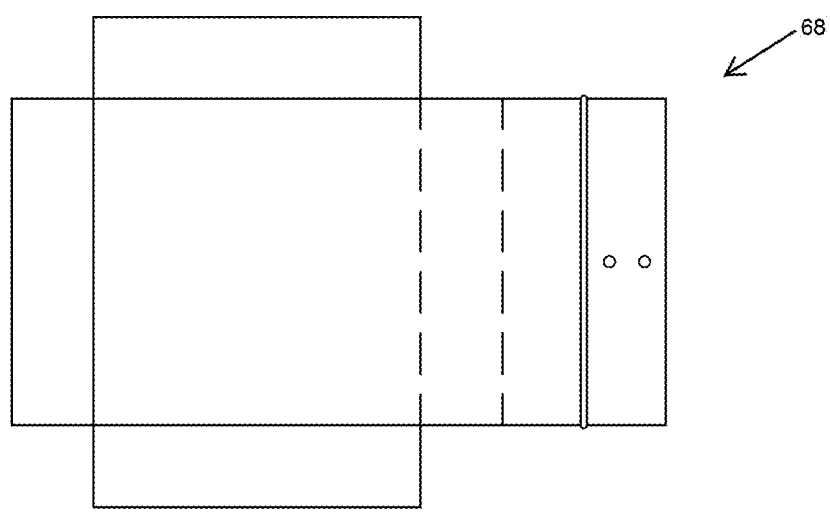
FIG. 8C is a top plan view of the conventional transition joint duct segment of FIG. 8A.
Figure 8D:
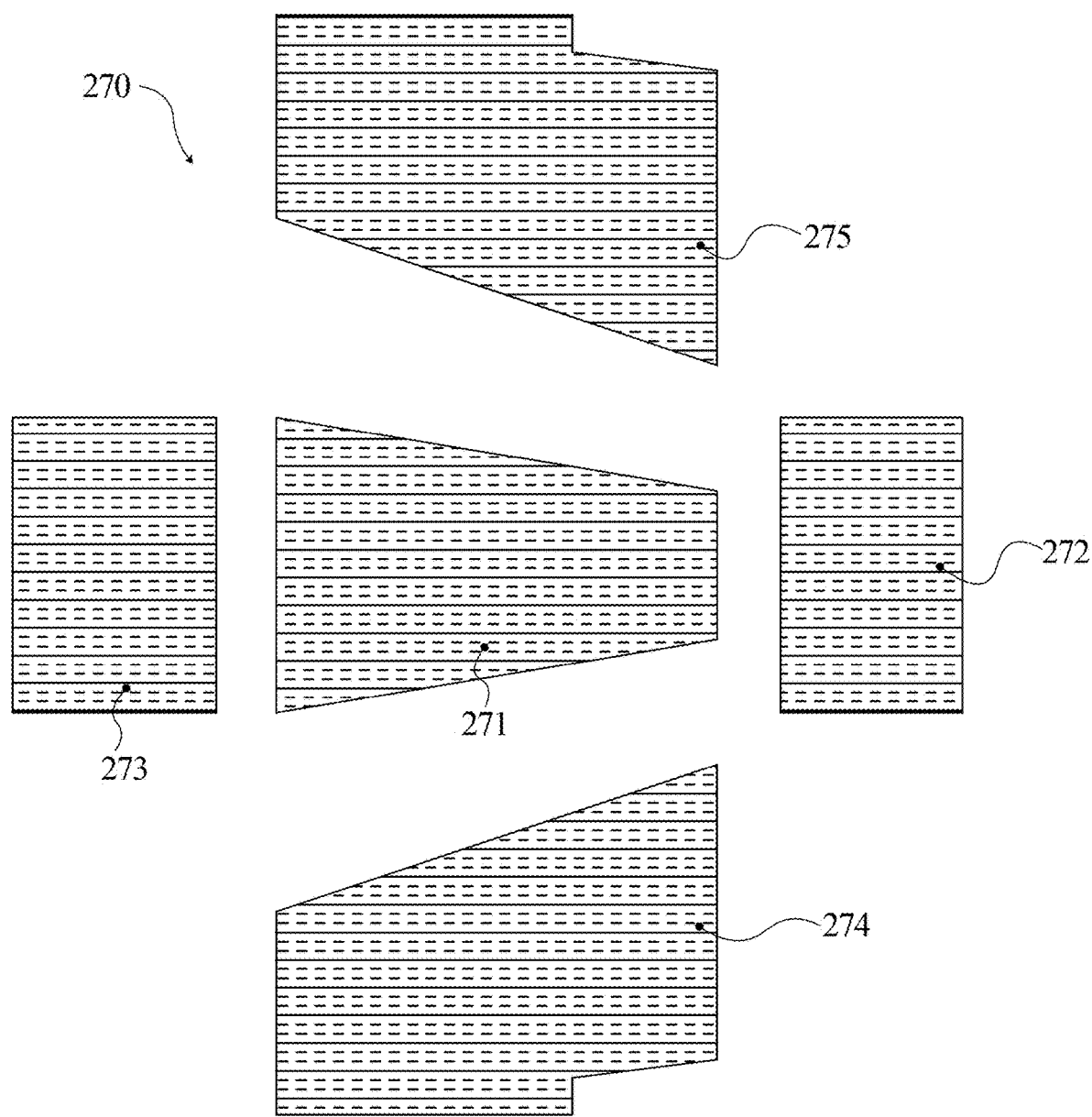
FIG. 8D is an exploded, top plan view of conventional insulation pieces for wrapping a transition joint duct segment.

Turning to FIGS. 8A-8C, a conventional transition joint 68 is shown, which is configured to transition a square or rectangular duct segment to a circular duct segment. FIG. 8D shows a conventional transition insulation piece 270 formed of individually cut sections including a top piece 271, two side pieces 275 and 274, a piece for the round port 272 and a back piece for the rectangular port 273.

Figure 9A:
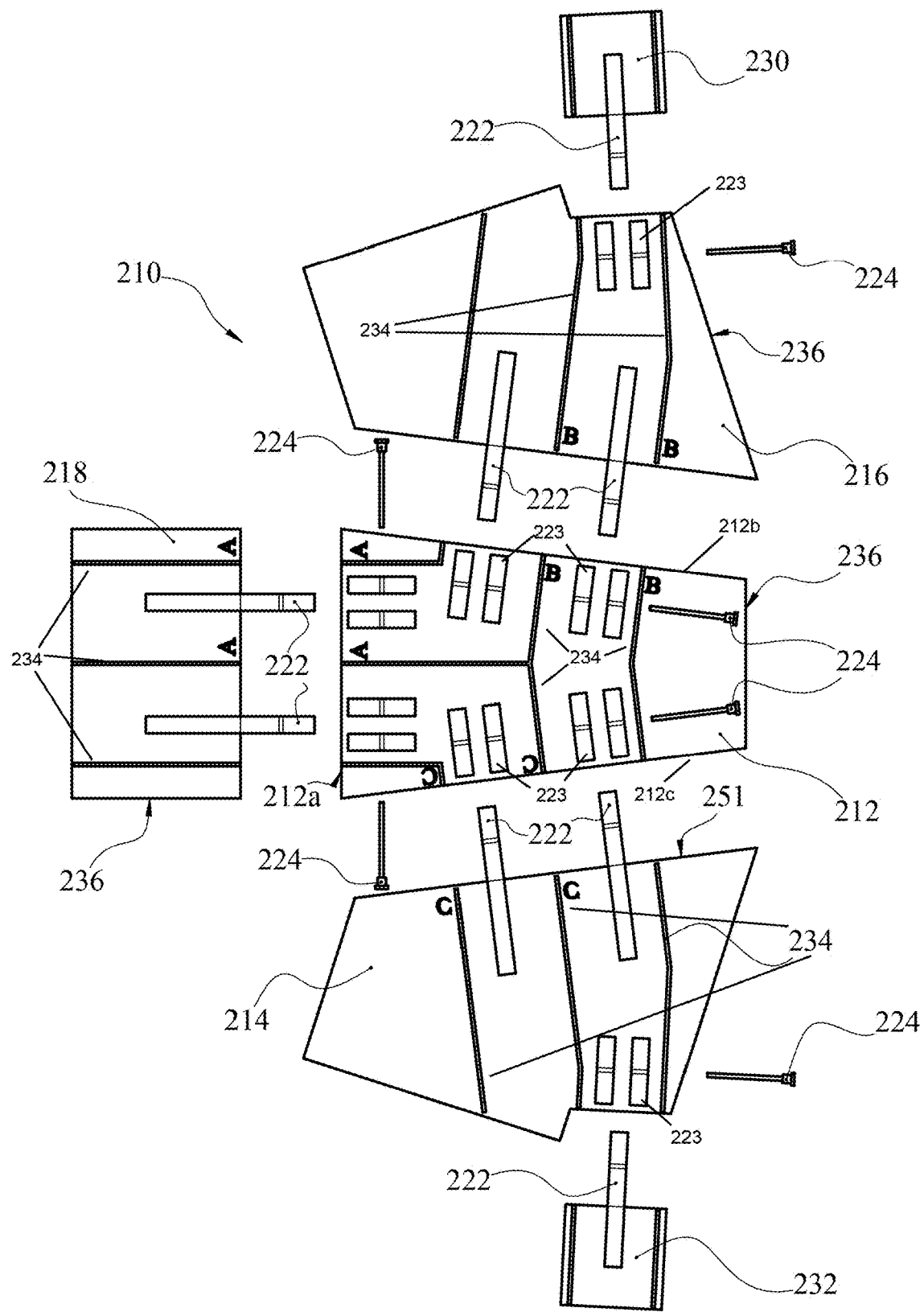
FIG. 9A is a top plan view of a modular, fabrication tool, according to a third embodiment of the present disclosure, in a disassembled configuration.
Figure 9B:
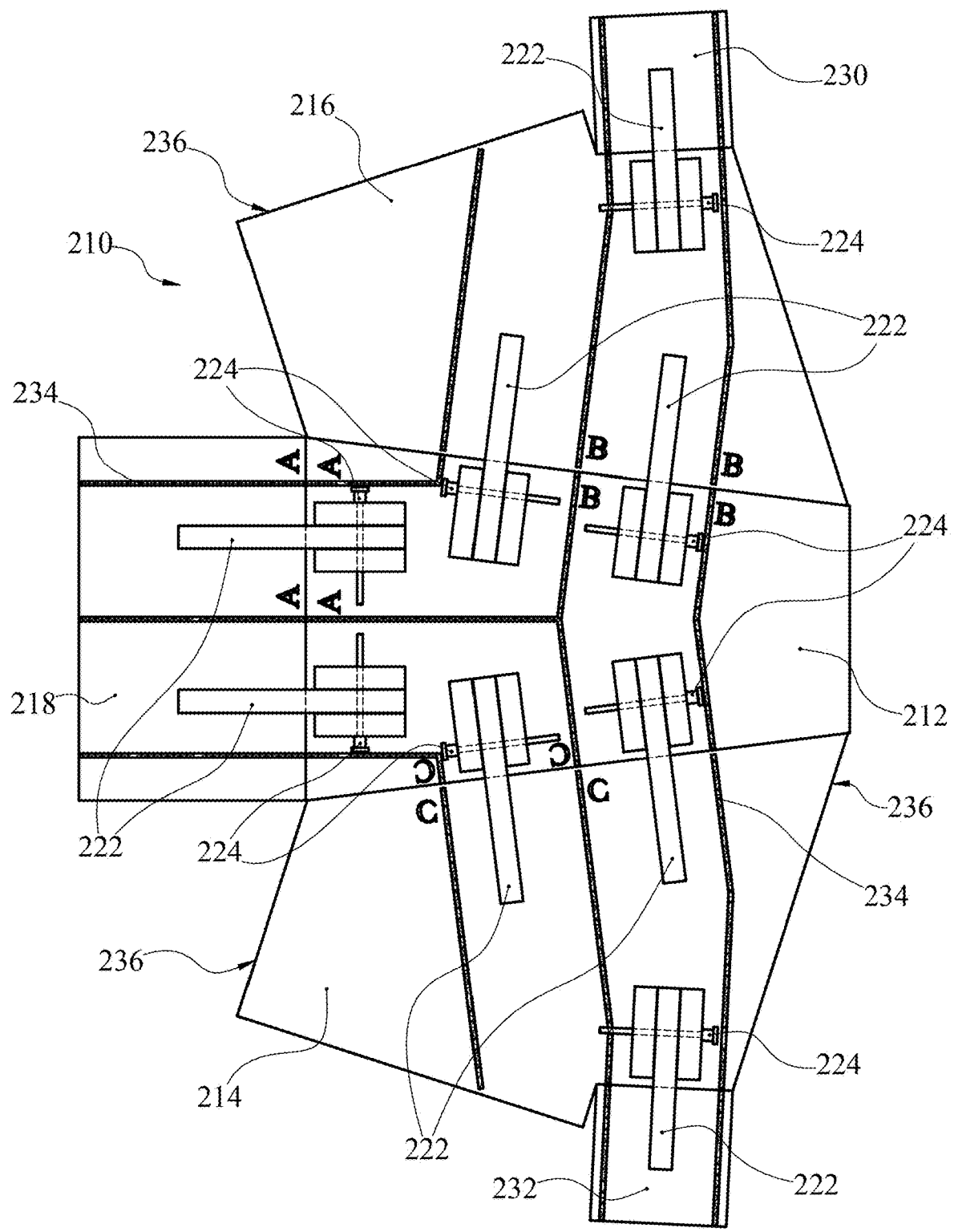
FIG. 9B is a top plan view the modular, fabrication tool of FIG. 9A, in an assembled configuration.

FIGS. 9A-9B illustrate a third embodiment of the modular, fabrication tool 210. The reference numerals of the present embodiment are distinguishable from those of the above-described embodiments by a factor of two-hundred (200), but otherwise indicate the same elements as indicated above, except as otherwise specified. The modular, fabrication tool 210 of the present embodiment is similar to that of the earlier embodiments. Therefore, the description of certain similarities between the embodiments may be omitted herein for the sake of brevity and convenience, and, therefore, is not limiting.

A primary difference between the modular, fabrication tool 210 and the modular, fabrication tools 10, 110 is that the modular fabrication tool 210 is configured for transition joint duct segments 68. The tool 210 includes interchangeable and detachably connected panels corresponding to the typical insulation pieces shown in FIG. 8D. As shown in FIGS. 9A and 9B, the tool 210 includes a first, e.g., top, panel 212, a second, e.g., first side, panel 214, a third, e.g., second side, panel 216, and a fourth, e.g., back, panel 218. Additionally, two additional panels are included, i.e., a fifth, e.g., round entry, panel 230 and a sixth, e.g., round entry, panel 232, to account, in split manner, for the round portion of the transition joint segments 68, which typically is covered by one piece of insulation 272 in FIG. 8D.

FIG. 9A shows the modular, fabrication tool 210 in a disassembled configuration. As shown, each panel 212, 214, 216, 218, 230, 232 may have at least one connecting bar 222 extending beyond at least one side of the respective panel, at least one connecting track 223, or both, for selectively and detachably connecting with one another, in a manner as previously described with respect to the modular fabrication tools 10, 110, but the disclosure is not so limited.

As shown, each panel 212, 214, 216, 218, 230, 232 includes guidelines 234 thereon, configured to simply proper assembly of the fabrication tool 210. That is, guidelines 234 of respective neighboring panels are positioned align when assembled together properly. Therefore, to assemble the modular, fabrication tool 210, as shown in FIG. 9B, appropriate panels are initially selected. Neighboring panels are properly joined together by aligning the guidelines 234 present on the panels. The fabrication tool 210 is fully assembled by lining up each section using the guidelines 234 to match corresponding edges of the side sections 214, 216, 218 to the top section 212. The sections are then pinned together using the connecting bars, 222, the connecting tracks 223 and the retaining pins 224, in a manner as previously described.

Once assembled, the tool 210 is used to fabricate the prefabricated insulation by placing the fully assembled tool 210 upon a rolled-out wrap of insulation. The insulation is subsequently cut along the outlining edge of the assembled tool 236 in a manner as previously described. Once the outline of the transition joint duct segment 68 is cut, the indents, creases, and or markings for the duct corner registration are made by disassembling the tool 210 one panel at a time and creasing or marking along the exposed edge. For example, unpinning the retaining pins 224 holding the top panel 212 and back panel 218 together, enables removing the back panel 218, thereby exposing the back-top edge 212a of the top panel 212, which is then indented, or creased by industrial press or markings made on the insulation along the edge 212a. The same process is repeated for the two round entry sections 230, 232 and their respective side sections 214, 216. Once the round sections 230, 232 are indented, creased, or marked, etc., the sides 214, 216 are removed and the corresponding exposed edges 212b, 212c on the top section 212 are then indented, crease, or marked, etc. Once the edges are indented, creased, or marked the adhesive 228 is added to sealing edges as shown in FIG. 10B.

Figure 10A:
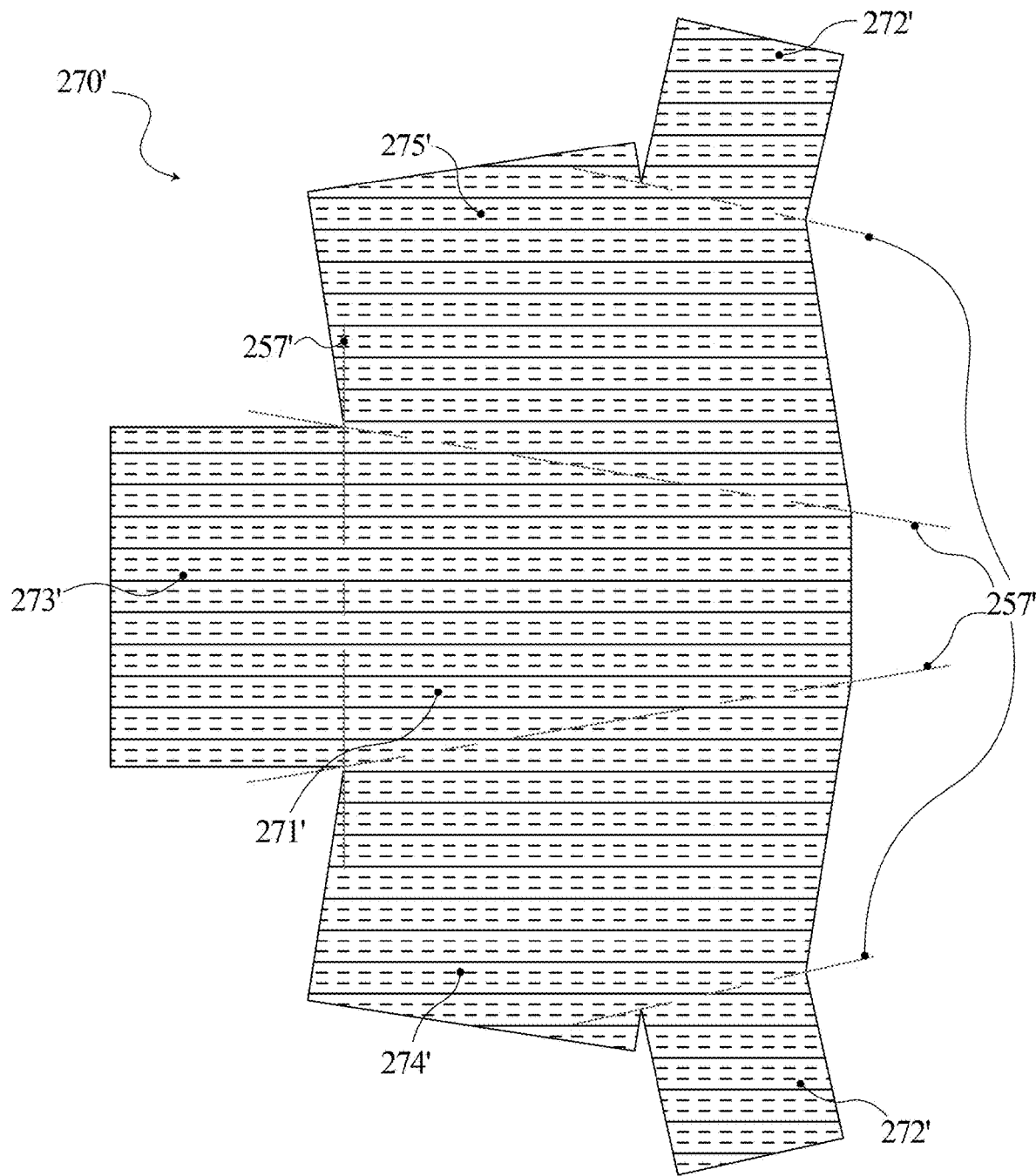
FIG. 10A is a top plan view of a prefabricated insulation wrap, according to the present disclosure, for a transition joint duct segment.
Figure 10B:
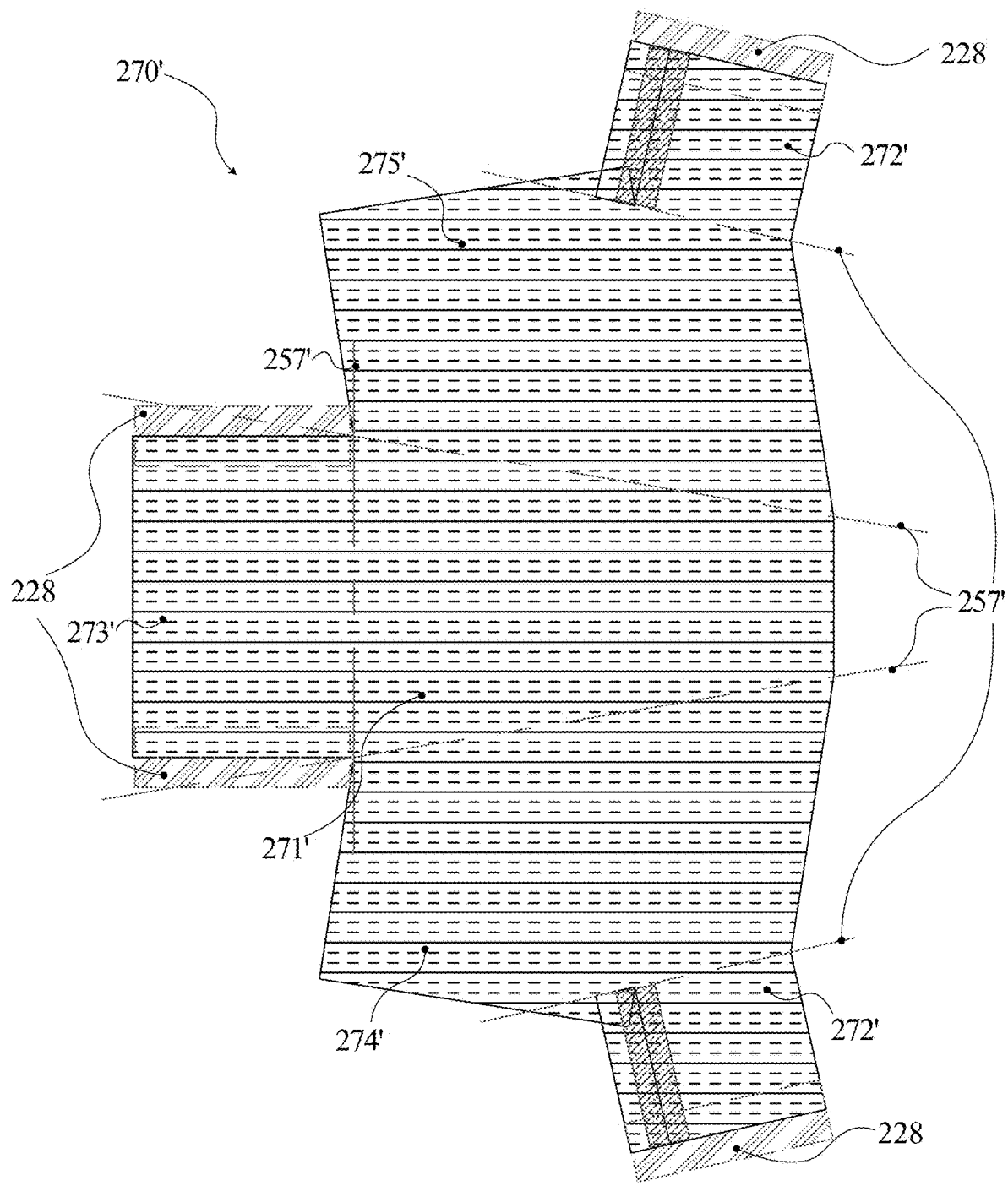
FIG. 10B is a top plan view of the prefabricated insulation wrap of FIG. 10A, with tape and indenting, creasing, or marking. for installation.

FIGS. 10A and 10B show the prefabricated insulation 270' for the transition joint duct segment 68. As can be seen, where traditionally seals would need to be made with adhesive, the prefabricated concept has indents, creases, or markings, 257' for easy install and peelable adhesive 228 attached to easily affix the insulation to the duct and maintain the seal.

It will be appreciated by those skilled in the art that various modifications and alterations could be made to disclosure above without departing from the broad inventive concepts thereof. Some of these have been discussed above and others will be apparent to those skilled in the art. It is understood, therefore, that this invention is not limited to the particular embodiments disclosed, but it is intended to cover modifications within the spirit and scope of the present disclosure, as set forth in the appended claims.

We claim:

1. A modular fabrication tool for prefabricating insulation for a duct segment, the tool comprising:
   at least three interchangeable and detachably connected panels, each panel of the at least three panels corresponding to a respective side of the duct segment,
   wherein each panel includes at least one of a connecting bar extending beyond a periphery of the respective panel or a connecting track, a connecting bar of one panel being received by a connecting track of a neighboring panel when two neighboring panels are properly positioned adjoined together, whereby a retaining pin of the tool is advanceable through aligned, respective apertures of the connecting track and the connecting bar received therein.

2. The modular fabrication tool of claim 1, wherein at least one panel is rectangular.

3. The modular fabrication tool of claim 1, wherein the duct segment is a straight duct segment, and the at least three interchangeable and detachably connected panels comprise four interchangeable and detachably connected panels.

4. The modular fabrication tool of claim 3, wherein each panel defines a length of four feet.

5. The modular fabrication tool of claim 3, wherein each of the four panels defines a respective width, and a total width of the four panels corresponds to a cross-sectional perimeter of the straight duct segment and an additional four inches.

6. The modular fabrication tool of claim 3, wherein two of the four panels define a first width and another two of the four panels define a second width, wherein the first width is equal to one inch greater than a cross-sectional height of the straight duct segment and the second width is equal to one inch greater than a cross-sectional width of the straight duct segment.

7. The modular fabrication tool of claim 3, wherein the four panels are rectangular.

8. The modular fabrication tool of claim 3, wherein at least one of the four panels includes incremental one-inch markings thereon.

9. The modular fabrication tool of claim 1, wherein the duct segment is an elbow joint duct segment, and the at least three interchangeable and detachably connected panels comprise three interchangeable and detachably connected panels.

10. The modular fabrication tool of claim 9, wherein one of the three panels is rectangular, and another two of the three panels have a shape of an annular sector.

11. The modular fabrication tool of claim 10, wherein opposing arc lengths of the two annular-sector shaped panels correspond to an external arc length of the joint duct segment and an internal arc length of the joint duct segment, respectively.

12. A method of prefabricating insulation for a duct segment using the modular fabrication tool of claim 1, the method comprising:
   assembling the tool by connecting the at least three panels together such that the connecting bar of one panel is received by the connecting track of the neighboring panel and the retaining pin is advanced through the aligned, respective apertures of the connecting track and the connecting bar received therein;
   placing the assembled tool upon a larger portion of insulation;
   cutting the insulation along at least one boundary of the assembled tool; and
   successively disconnecting one panel at a time and creasing, indenting or marking the insulation along an edge exposed from the disconnecting.

13. The method of claim 12, wherein the cutting step comprises cutting the insulation along an entire external periphery of the assembled tool.

14. The method of claim 12, further comprising attaching a strip of adhesive along a free terminal edge thereof.

15. The method of claim 12, wherein at least one of the panels includes incremental one-inch markings thereon, and wherein the placing step comprises positioning the assembled tool upon the larger portion of insulation such that one of the markings is aligned with a terminal end of the larger portion of insulation and cutting the larger portion of insulation along the marking.

* * * * *